United States Patent
Liu et al.

(10) Patent No.: US 9,733,402 B2
(45) Date of Patent: Aug. 15, 2017

(54) REFLECTIVE COLOR DISPLAY BASED ON TUNABLE SUB-WAVELENGTH HIGH CONTRAST GRATINGS

(71) Applicant: UNIVERSITY OF SOUTHERN CALIFORNIA, Los Angeles, CA (US)

(72) Inventors: He Liu, Los Angeles, CA (US); Yuhan Yao, Los Angeles, CA (US); Wei Wu, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 14/640,423

(22) Filed: Mar. 6, 2015

(65) Prior Publication Data
US 2015/0253470 A1 Sep. 10, 2015

Related U.S. Application Data

(60) Provisional application No. 61/948,909, filed on Mar. 6, 2014.

(51) Int. Cl.
| | | |
|---|---|---|
| G02F 1/153 | (2006.01) | |
| G02F 1/01 | (2006.01) | |
| G02B 5/18 | (2006.01) | |
| G02B 26/00 | (2006.01) | |
| G02F 1/23 | (2006.01) | |
| G02F 1/19 | (2006.01) | |
| G02F 1/21 | (2006.01) | |

(52) U.S. Cl.
CPC ......... *G02B 5/1842* (2013.01); *G02B 5/1814* (2013.01); *G02B 5/1828* (2013.01); *G02B 26/005* (2013.01); *G02B 26/007* (2013.01); *G02F 1/19* (2013.01); *G02F 1/21* (2013.01); *G02F 1/23* (2013.01); *G02F 2201/307* (2013.01); *G02F 2203/12* (2013.01)

(58) Field of Classification Search
USPC ........ 359/237, 242, 265–267, 279, 290–295, 359/298
See application file for complete search history.

(56) References Cited

U.S. PATENT DOCUMENTS

| | | | | |
|---|---|---|---|---|
| 2001/0015850 A1* | 8/2001 | Kowarz | ............. | G02B 26/0808 359/572 |
| 2005/0237475 A1* | 10/2005 | Chou | ................. | G02F 1/133553 349/198 |
| 2007/0164975 A1* | 7/2007 | Lim | .................... | F21V 33/0052 345/102 |
| 2011/0116010 A1* | 5/2011 | Nagata | ................... | G02B 6/005 349/62 |

(Continued)

OTHER PUBLICATIONS

Liu et al., "Full-color reflective display system based on high contrast gratings," Journal of Vacuum Science & Technology B 32(6), Nov./Dec. 2014.

*Primary Examiner* — Brandi Thomas
(74) *Attorney, Agent, or Firm* — Snell & Wilmer LLP

(57) ABSTRACT

A sub-pixel unit for a reflective display includes a color filter including a tunable high contrast grating. The tunable high contrast grating reflects light within a first range of wavelengths, and the sub-pixel unit can exist in a first state and a second state, the first state reflecting at least one of (i) light within a different range of wavelengths, and (ii) light of a different intensity level, than the second state.

23 Claims, 46 Drawing Sheets

(56) References Cited

U.S. PATENT DOCUMENTS

2013/0058370 A1* 3/2013 Chang-Hasnain ..... B82Y 20/00
372/50.11
2013/0301109 A1* 11/2013 Maillard .............. G02B 26/005
359/290

* cited by examiner

Reflective color construction with RGB sub-pixels

Reflective color construction with stacked RGB reflectors

| Color | P (nm) | L₁ (nm) | H₁ (nm) | L₂ (nm) | H₂ (nm) |
|---|---|---|---|---|---|
| Blue | 380 | 190 | 200 | 100 | 300 |
| Green | 380 | 270 | 233 | 133 | 300 |
| Red | 450 | 333 | 200 | 200 | 300 |

FIG. 4(d)

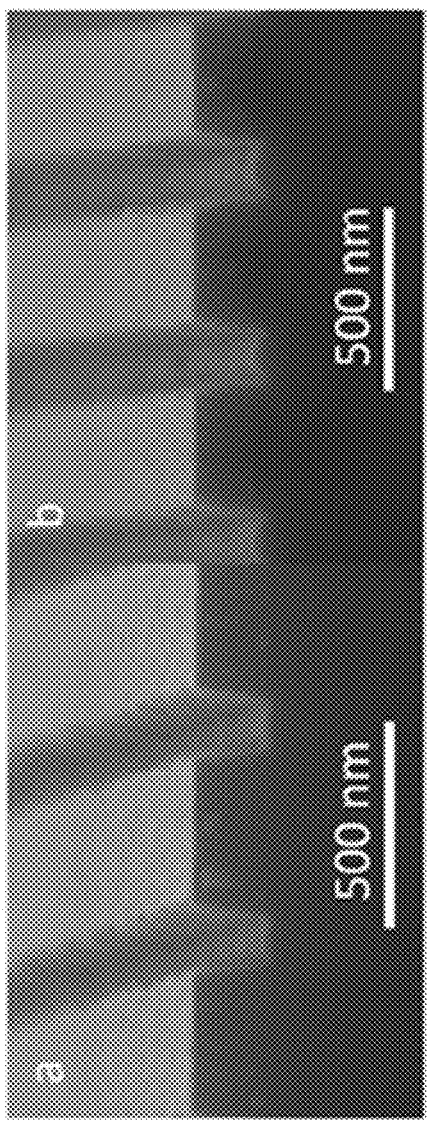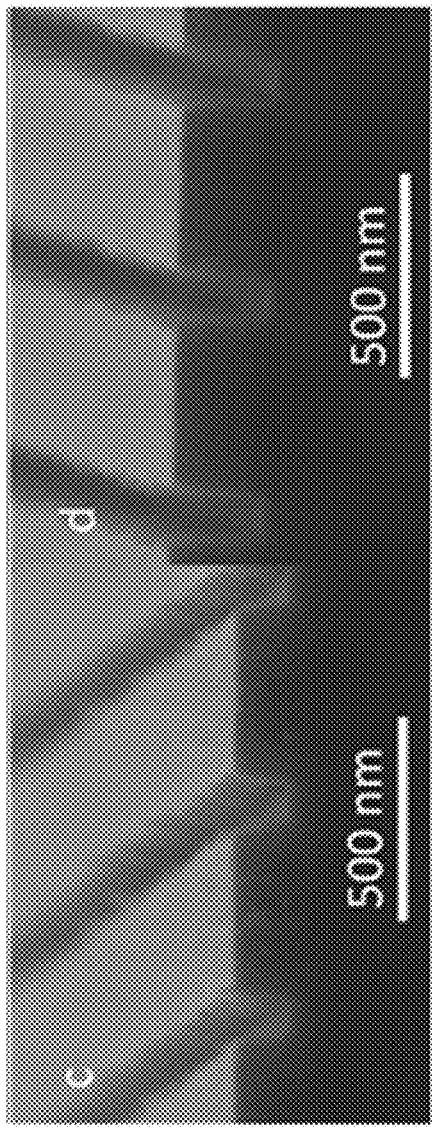
FIG. 32(a)  FIG. 32(b)  FIG. 32(c)  FIG. 32(d)

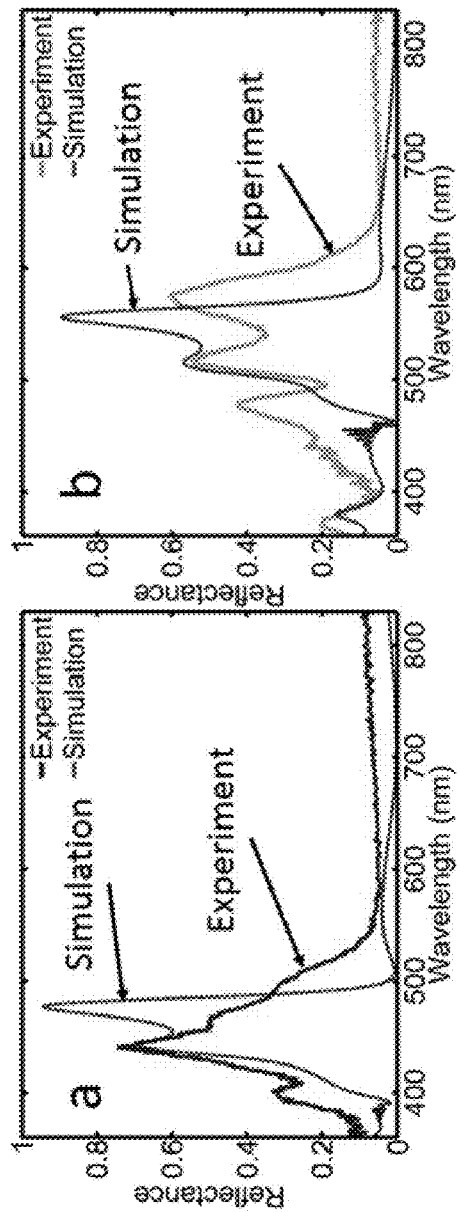
FIG. 35(a)
FIG. 35(b)
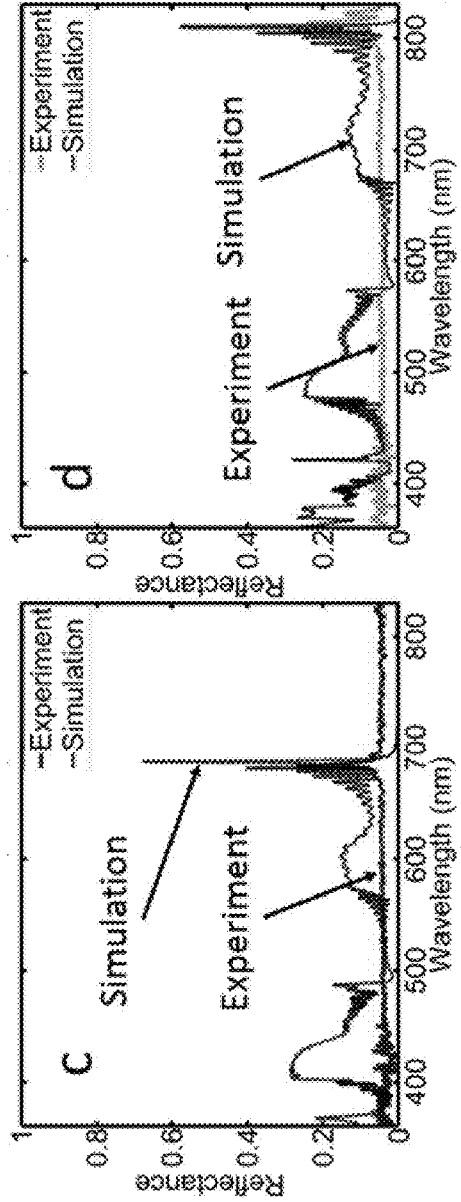
FIG. 35(c)
FIG. 35(d)

US 9,733,402 B2

REFLECTIVE COLOR DISPLAY BASED ON TUNABLE SUB-WAVELENGTH HIGH CONTRAST GRATINGS

CROSS REFERENCE TO RELATED APPLICATIONS

This application claims the benefit of U.S. Provisional Patent Application Ser. No. 61/948,909, filed Mar. 6, 2014; titled REFLECTIVE COLOR DISPLAY BASED ON TUNABLE SUB-WAVELENGTH HIGH CONTRAST GRATINGS, which is hereby incorporated by reference in its entirety for all of its teachings.

FIELD

The present invention generally relates to display technologies for reflective displays.

INTRODUCTION

Conventional color display technologies generally use multiple parallel sub-pixels to display red, green and blue (RGB) colors and construct colors using RGB. This means that for reflective color displays, at maximum, only one third of the light hitting the display is reflected. Accordingly, improved techniques are needed to produce reflective color displays which can reflect a higher proportion of the incoming light.

SUMMARY

The display technologies described herein employ sub-wavelength high contrast gratings as components of display sub-pixels, which can be arranged in parallel or as multiple layers. Three different high contrast gratings may be used to selectively transmit or reflect red, green and blue light, respectively. The wavelength shifting characteristics of the gratings can be tuned through the use of a variety of techniques including, for example, electrowetting, the incorporation of phase change material, and microelectromechanical systems (MEMS). This display technology has applications in mobile computer and electronic devices, TV, and other applications incorporating a display.

The invention provides a sub-pixel unit for a reflective display includes a color filter including a tunable high contrast grating. The tunable high contrast grating reflects light within a first range of wavelengths, and the sub-pixel unit can exist in a first state and a second state, the first state reflecting at least one of (i) light within a different range of wavelengths, and (ii) light of a different intensity level, than the second state.

Other aspects of the invention will become apparent by consideration of the detailed description and accompanying drawings.

BRIEF DESCRIPTION OF THE DRAWINGS

The drawings below are supplied in order to facilitate understanding of the description and examples provided herein.

FIG. 1(a) a schematic of an exemplary full-color reflective display; FIG. 1(b) the ideal reflection spectra for exemplary blue, green and red color filters; FIG. 1(c) light reflection from adjacent color pixels (top panel) compared to stacked color pixels (bottom); and FIG. 1(d) a diagram depicting the smaller structures as described herein within an exemplary reflective display.

FIGS. 4(a)-4(d) show FIG. 4(a) an exemplary sub-wavelength high contrast grating; FIG. 4(b) various embodiments of a unit structure within the grating of FIG. 4(a); FIG. 4(c) the geometric parameters and spectra for an exemplary blue filter with a T-shaped pillar; and FIG. 4(d) the geometric parameters for exemplary green, blue and red filters with a T-shaped pillar.

FIG. 5(a) reflection spectrum for blue light in reflection mode and anti-reflection mode; FIG. 5(b) reflection spectrum for green light in reflection mode and anti-reflection mode; FIG. 5(c) reflection spectrum for red light in reflection mode and anti-reflection mode; and FIG. 5(d) reflection spectrum for white light.

FIG. 13(a) is the tunable sub-pixel in one state; FIG. 13(b) is the tunable sub-pixel in a different state.

FIG. 14(a) is the tunable sub-pixel in one state; FIG. 14(b) is the tunable sub-pixel in a different state; and FIG. 14(c) is the tunable sub-pixel in yet a further state.

FIG. 15(a) is the tunable sub-pixel in one state; FIG. 15(b) is the tunable sub-pixel in a different state.

FIG. 16(a) is the tunable sub-pixel in one state; FIG. 16(b) is the tunable sub-pixel in a different state.

FIG. 17(a) is the tunable sub-pixel in one state; FIG. 17(b) is the tunable sub-pixel in a different state.

FIG. 23(b) a parallel structure.

FIG. 25(a) is a schematic of a sub-wavelength absorptive filter on two sides of a substrate; FIG. 25(b) is a schematic of a sub-wavelength absorptive filter on one side of a substrate.

FIGS. 32(a)-32(d) shows SEM images of an exemplary color filter etched with a variety of RIE etching preparations.

FIGS. 35(a)-35(d) show the measured and simulated reflection spectra for exemplary color filters.

DETAILED DESCRIPTION

Figure 1A:
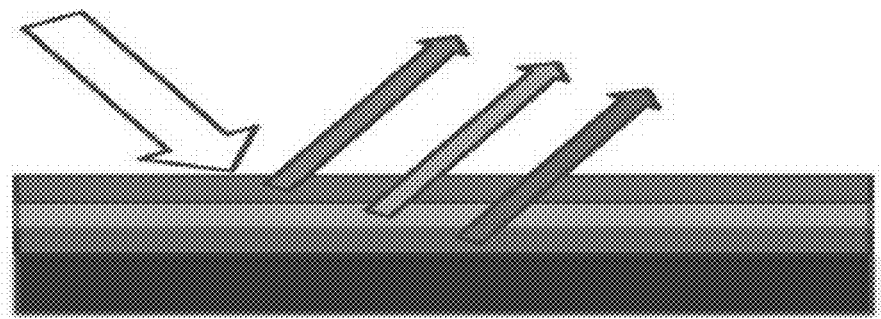
FIGS. 1(a)-1(d) show.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It also should be understood that any numerical range recited herein includes all values from the lower value to the upper value. For example, if a range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated herein.

It should be understood that, as used herein, the term "about" is synonymous with the term "approximately." Illustratively, the use of the term "about" indicates that a value includes values slightly outside the cited values. Variation may be due to conditions such as experimental error, manufacturing tolerances, variations in equilibrium conditions, and the like. In some embodiments, the term "about" includes the cited value plus or minus 10%. In all cases, where the term "about" has been used to describe a value, it should be appreciated that this disclosure also supports the exact value.

Reference throughout this specification to "one embodiment," "an embodiment," or similar language means that a particular feature, structure, or characteristic described in connection with the embodiment is included in at least one embodiment of the invention provided herein. Thus, appearances of the phrases "in one embodiment," "in an embodiment," and similar language throughout this specification may, but do not necessarily, all refer to the same embodiment.

Furthermore, the described features, structures, or characteristics of the methods, compositions, and kits provided herein may be combined in any suitable manner in one or more embodiments. In the following description, numerous specific details are provided, to provide a thorough understanding of embodiments. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the embodiments.

The depicted order and labeled steps depicted in schematic diagrams are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. Additionally, the order in which a particular method occurs may or may not strictly adhere to the order of the corresponding steps shown.

As used herein, words referring to colors typically refer to particular ranges of wavelengths within the electromagnetic spectrum corresponding to visible light. Generally, the wavelengths for visible light range from about 380 nm to about 800 nm, although for display technologies, useful wavelengths include infrared light up to about 1050 nm, and ultraviolet light down to about 310 nm. For computer or display gamut, the range of colors accurately represented (i.e. the color space) may be described in a chromaticity diagram such as a CIE 1931 color space chromaticity diagram.

Figure 1B:
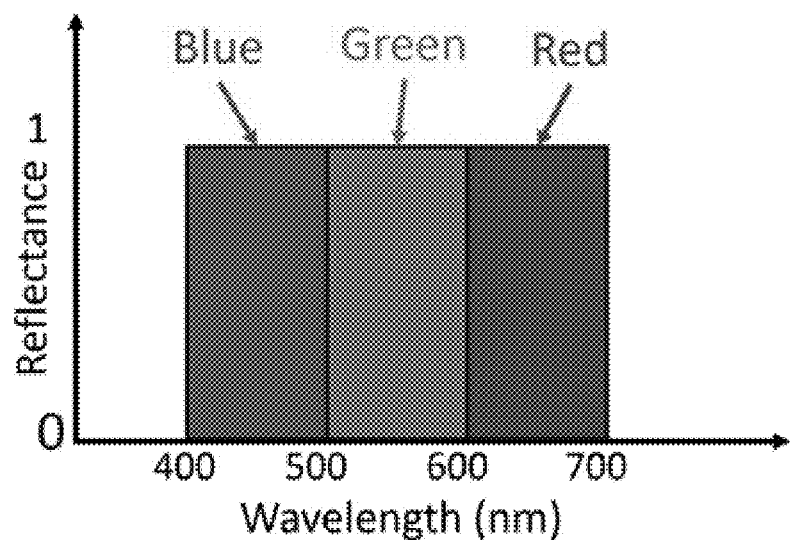
Figure 1C:
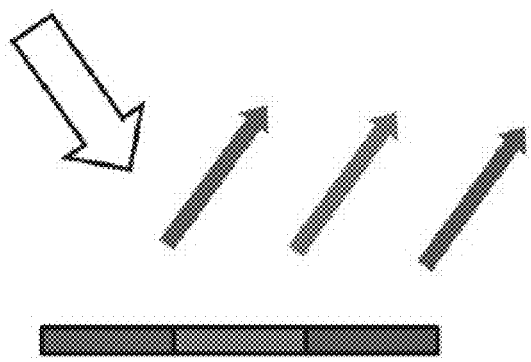
Figure 1C:
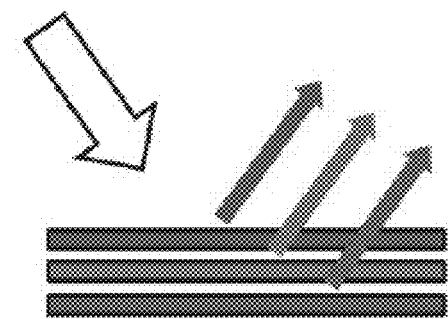

Conventional color display technologies generally use multiple parallel sub-pixels to display red, green and blue (RGB) colors and construct colors using RGB (FIG. 1(c), top panel). This means that for reflective color displays, at maximum, only one third of the light hitting the display is reflected. The color display technologies described herein employ sub-wavelength high contrast gratings as components of display pixels, which can be arranged in parallel (FIG. 1(c), top panel) or as multiple layers (FIG. 1(c), bottom panel). A schematic of an exemplary layered color display is in FIG. 1(a). Three different high contrast gratings may be used to selectively transmit or reflect red, green and blue light, respectively. The wavelength shifting characteristics of the gratings can be tuned through the use of a variety of techniques including, for example, electrowetting, the incorporation of phase change material, and microelectromechanical systems (MEMS), as described further below. Reflective display technology has applications in computer and electronic devices, including televisions, e-reader and other tablet computer devices, laptop computers, desktop computers, and other applications incorporating a display. When used for a reflective color display, the technology can provide more vivid color than conventional reflective display technologies.

A full color display which incorporates sub-wavelength high contrast gratings is described herein, along with methods of producing such a display. The display includes a plurality of pixels, where each pixel is made up of one or more sub-pixels. Each pixel is independently controllable so that the color, intensity, and other properties of that pixel can be the same as or different from any of the other pixels. The one or more sub-pixels of a given pixel function together to generate the particular color, intensity, and other properties of that pixel. For example, the sub-pixels may consist of several elements that are next to one another as shown in the top panel of FIG. 1(c) or the sub-pixels may consist of several elements that are stacked on top of one another as shown in the bottom panel of FIG. 1(c).

Each sub-pixel includes a tunable high contrast grating and has at least two states of which the reflection and/or transmission spectra are different. Thus, each sub-pixel operates as both a color filter (controlling which range of wavelengths is reflected/transmitted) and a light valve (controlling how much light is reflected/transmitted within the particular wavelength range). For example, in an embodiment, the sub-pixel may reflect blue color in one state whereas, in another state, the amount of blue light that is reflected may become very low or the reflection spectrum of the grating may be shifted to another wavelength range. In some embodiments, the reflection spectrum may include or be entirely composed of wavelengths outside of the visible spectrum. The high contrast gratings may be used to switch the wavelength of reflected and/or transmitted light between different states. Although the sub-wavelength high contrast gratings described herein may be used for applications using either transmitted or reflected light, it is described in the context of reflected light for simplicity. Nonetheless, the principles disclosed herein may be applied to either reflected or transmitted light and may be used with devices which make use of reflected light, transmitted light, or both.

Reflective displays do not require internal light sources (e.g. are often not backlit) and can reflect only ambient light, which gives them several unique advantages including low power consumption, a "paper-like" reading experience, and the ability to be read in sunlight. These properties make them particularly suitable for applications such as e-book readers, signage, electronic shelf labels, and displays for portable devices when power consumption is of concern. One example of a reflective display device is the Amazon Kindle® e-reader equipped with a black and white reflective display. Despite the success of the monochromic reflective display, a full-color reflective display presents challenges such as brightness, color gamut, and contrast ratio. Progress toward a practical full-color reflective display has been reported using different approaches, such as electrophoretic displays, conventional electrowetting displays, and cholesteric liquid crystal displays. However, these approaches still suffer from low reflection efficiency. The full-color displays described herein, on the other hand, incorporate switchable reflective color filters which include one or more sub-wavelength high contrast gratings and exhibit high reflection efficiency, a large color gamut, and a high contrast ratio.

Reflective color filters are elements in embodiments of the reflective displays disclosed herein, and the filters may exhibit certain properties. To aid in achieving high brightness, the peak value of a reflection spectrum should be close to one (i.e. close to 100% of the light is reflected). Thus, in some embodiments a color filter for a given color (wavelength range) will reflect 50% (0.5) or more of the light of the given color and not reflect (generally transmit) the remaining light; less than 25% (0.25) of the light of other portions of spectrum other than the given color (i.e. outside the wavelength range) is reflected by the color filter. In the case of a portion of the spectrum corresponding to a certain color, e.g. blue, the color filter will produce the characteristic blue color without reflecting the remaining portions of the spectrum, e.g. the green and red portions. In various embodiments, the color filter will reflect at least about 50%, at least about 60%, at least about 70%, at least about 80%, or at least about 90% of the impinging light within the bandwidth of the color filter. In certain embodiments, the color filter will reflect less than about 25%, less than about 20%, less than about 15%, less than about 10%, or less than about 5% of the impinging light within the bandwidth of the color filter.

Also, the bandwidth, which may be assessed using, e.g., the full width at half maximum (FWHM), should be broad enough to cover a reasonable range in the visible spectrum to achieve a high reflection efficiency, but also be somewhat limited in order to obtain a high color saturation. A simplified schematic of the reflection spectra of blue, green and red filters is shown in FIG. 1(b).

Figure 1D:
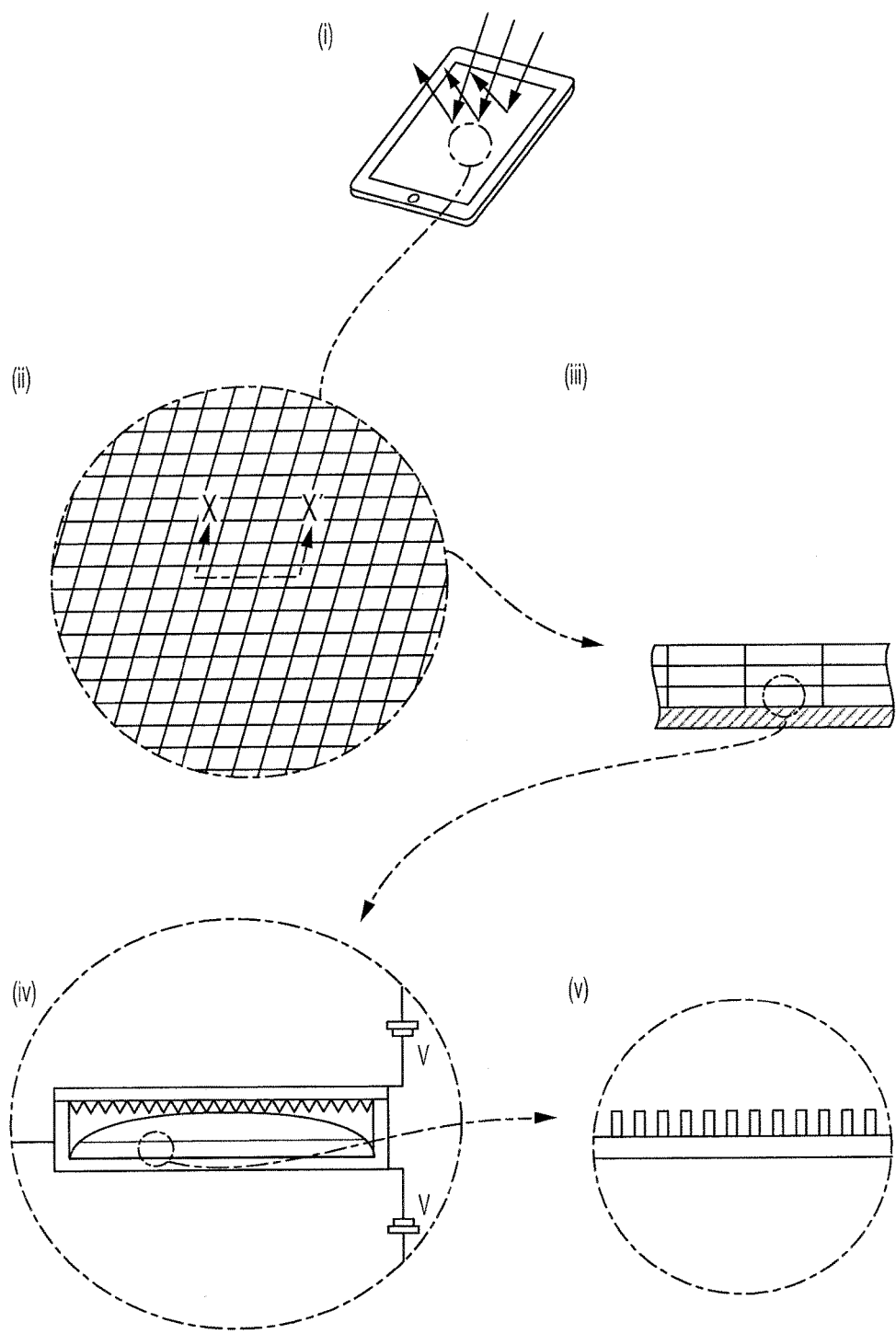

FIG. 1(d) gives an overview of an electronic device which includes a full-color reflective display incorporating the technology disclosed herein. Panel (i) shows an electronic device (e.g. a tablet-style reader) with a reflective display in which a series of light beams are shown reflecting off the surface. Panel (ii) shows a close-up of a small portion of the reflective display of the electronic device, where the reflective display includes an array of pixels. Panel (iii) shows a cross-section through three of the pixels corresponding to the line X-X' in panel (ii). In the embodiment shown in panel (iii), the sub-pixels are stacked on top of one another such that each vertical stack in panel (iii) reflects light of a particular portion of the spectrum with a particular intensity, which is determined by the properties of the individual sub-pixels stacked on top of one another. Each of the three side-by-side stacks of sub-pixels shown in panel (iii) is a separately-controllable pixel which can generate a separate color/intensity level. Panel (iv) shows a single sub-pixel which is similar to the sub-pixel shown in a cross-section through FIG. 13(b), although other designs are possible. Finally, panel (v) shows a portion of a high-contrast grating that makes up the color filter in this sub-pixel; while the high-contrast grating shown in panel (v) uses a pillar design, other types of color filters employing other types of high-contrast gratings may also be used.

Figure 2:
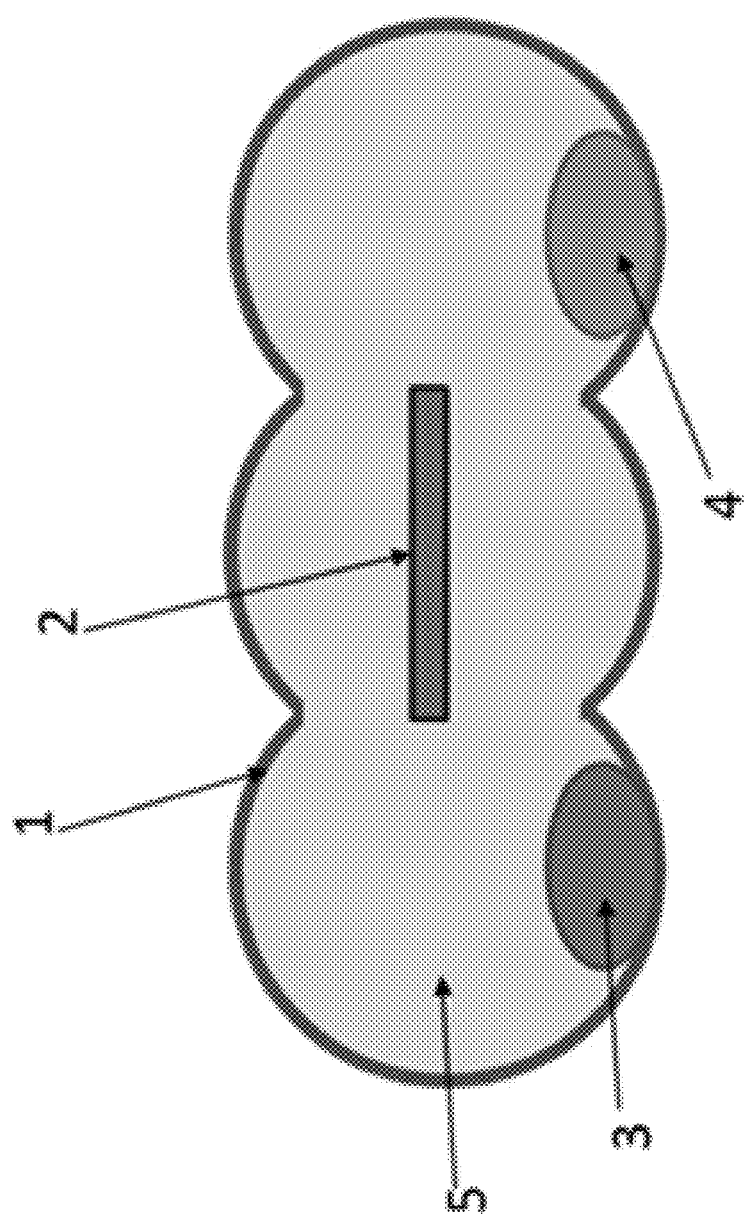
FIG. 2 shows a conceptual sub-pixel structure, insisting of a color filter and different substances, the substance can either be in contact with the color filter, or be apart from it, resulting in different reflected colors, or intensities.

In various embodiments, the reflection spectrum of a color filter may be affected by the configuration of its surrounding substances. FIG. 2 shows a conceptual structure of an embodiment of a sub-pixel of a color filter, as viewed from the side with impinging light coming from above, in which different configurations/combinations of the components result in different reflection spectra of the color filter. In FIG. 2, the border of the sub-pixel is shown by the number 1. The color filter is shown by 2, and its reflection and/or transmission spectrum is affected by surrounding substances shown by numbers 3, 4 and 5. The three substances shown by numbers 3, 4 and 5 can be solids, liquids, gases or any combination thereof. The substance shown by number 5 is a background substance. In an embodiment, the pixel includes a color filter and one surrounding substance. In certain embodiments, the pixel includes a color filter and multiple surrounding substances. The interactions with and relative positions of the color filter 2 relative to the substances 3, 4, 5 will impact the intensity and spectrum of the light that is reflected and/or transmitted by the sub-pixel. For example, the substances may be moved partially or completely out of the path of the color filter 2 (FIG. 3(a)), surround the color filter 2 (FIG. 3(b)), or coat the bottom (FIG. 3(c)) or top (FIG. 3(d)) surface of the color filter 2.

The change of the configuration of the surrounding substances can occur in various manners, such as a change in the relative position of a component (e.g. the color filter 2 or one or more of the substances 3, 4, 5) or a change in the physical or optical properties of a component. However, unlike conventional electrowetting displays in which the reflection area of an ink is altered to produce a resulting change in light reflectance, the displays described herein generate changes in reflectance based on changes in the properties of the color filter and/or interactions of substances with the filter. In various embodiments, changes in the relative positions of the components (e.g. the color filter 2 and substances 3, 4, 5) may be induced using techniques such as electrowetting or MEMS, as discussed further below. For example, if the substance shown by number 3 is not in contact with the color filter 2, then the pixel may reflect green light. Similarly, if the substance shown by number 4 is in contact with the floor filter, the pixel may become transparent.

A conceptual diagram of various possible states of a sub-pixel is shown in FIGS. 3(a)-3(d), which provides a magnification of FIG. 2 highlighting the interactions between the color filter (shown by number 2) and two substances shown by numbers 1 (background substance) and 3; nonetheless, other combinations of substances with the color filter are also possible. Several embodiments of this sub-pixel which show various configurations for the color filter to interact with the surrounding substances are shown in FIGS. 3(a)-3(d), described more fully below. Each configuration corresponds to a different state of the sub-pixel with different reflection spectra.

Figure 3A:
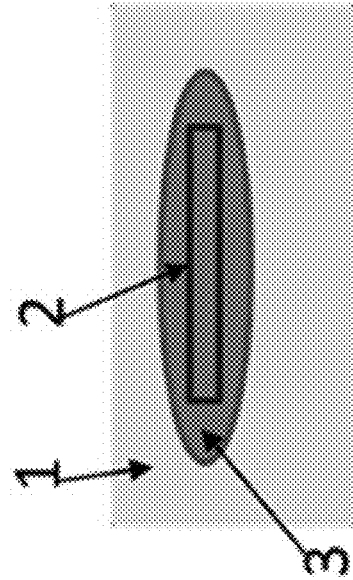
FIGS. 3(a)-3(d) show a conceptual sub-pixel structure demonstrating different possible states of a sub-pixel in which the substances can either be in contact with the color filter or away from it.
Figure 3B:
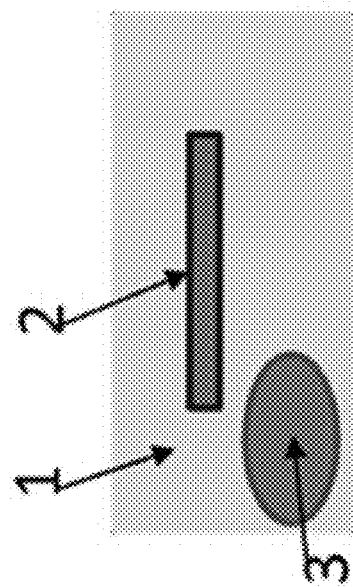
Figure 3C:
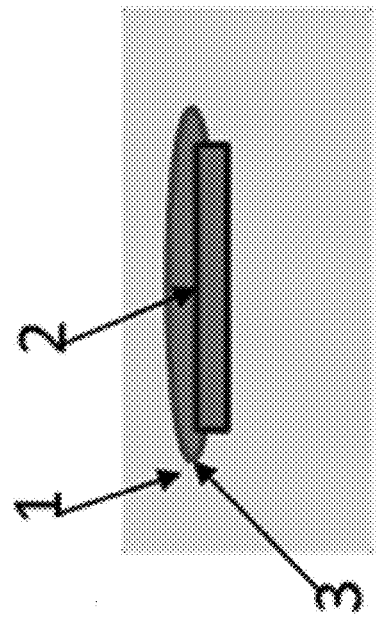
Figure 3D:
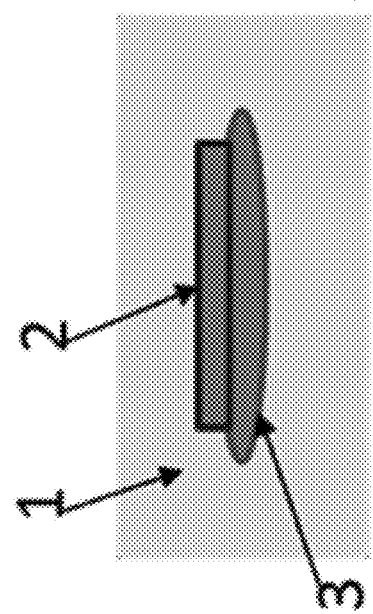

FIG. 3(a) shows a configuration where the color filter is not in contact with the substance shown by number 3. FIGS. 3(b), 3(c) and 3(d) show configurations where the color filter is in full contact (FIG. 3(b)), and in partial contact (FIGS. 3(c) and 3(d)), with the substance shown by number 3. The color filter is in contact with the background substance in all configurations shown in FIGS. 3(a)-3(d).

Figure 4A:
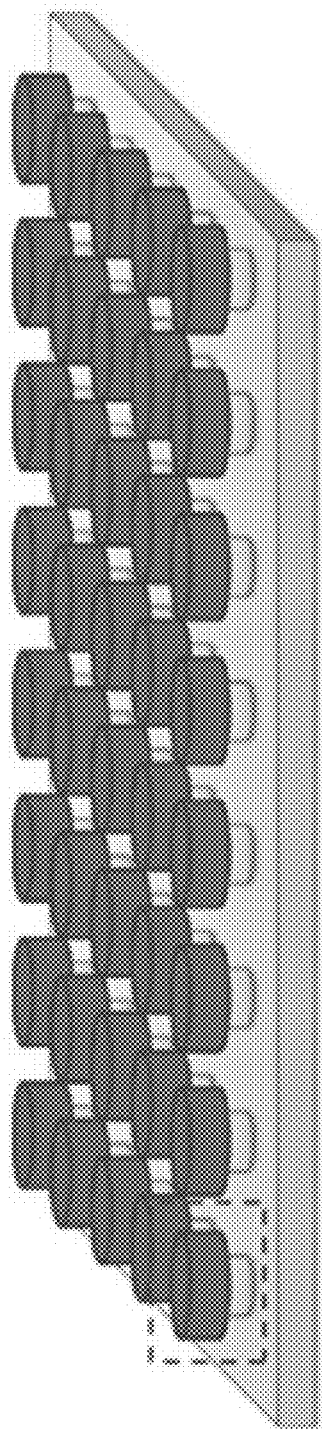

The color filter may include a sub-wavelength high contrast grating of any number of designs disclosed herein, including for example the design shown in FIG. 4(a), which is able to reflect light in a selective manner. In various embodiments of a color display pixel such as those shown in FIG. 1(c), three or more layers of gratings with different parameters may be used to reflect blue, green and red light, respectively, where the reflecting properties of each color filter/grating in the pixel are modulated using one or more of the mechanisms disclosed herein. Thus, for example, the intensity of reflection of each sub-pixel can be independently tuned to change the amount of blue, green, and red light, respectively, reflected from each sub-pixel.

For simplicity the present disclosure refers to color filters designed to reflect/transmit blue, green, and red light. However, the spectrum (including visible, UV, and IR) may be divided up in other ways and in different numbers of sub-pixels using the principles disclosed herein. For example, the spectrum may be divided into portions corresponding to cyan/magenta/yellow or other color schemes. In addition, the spectrum may be divided into three, four, five, six, or any other number of portions, the reflection of each of which is independently controlled by a separate sub-pixel containing an appropriately-tuned color filter.

Figure 4B:
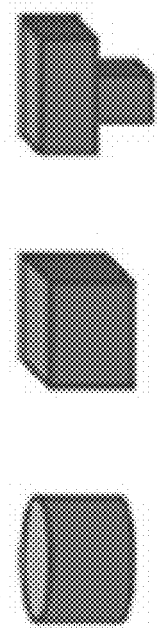
Figure 4C:
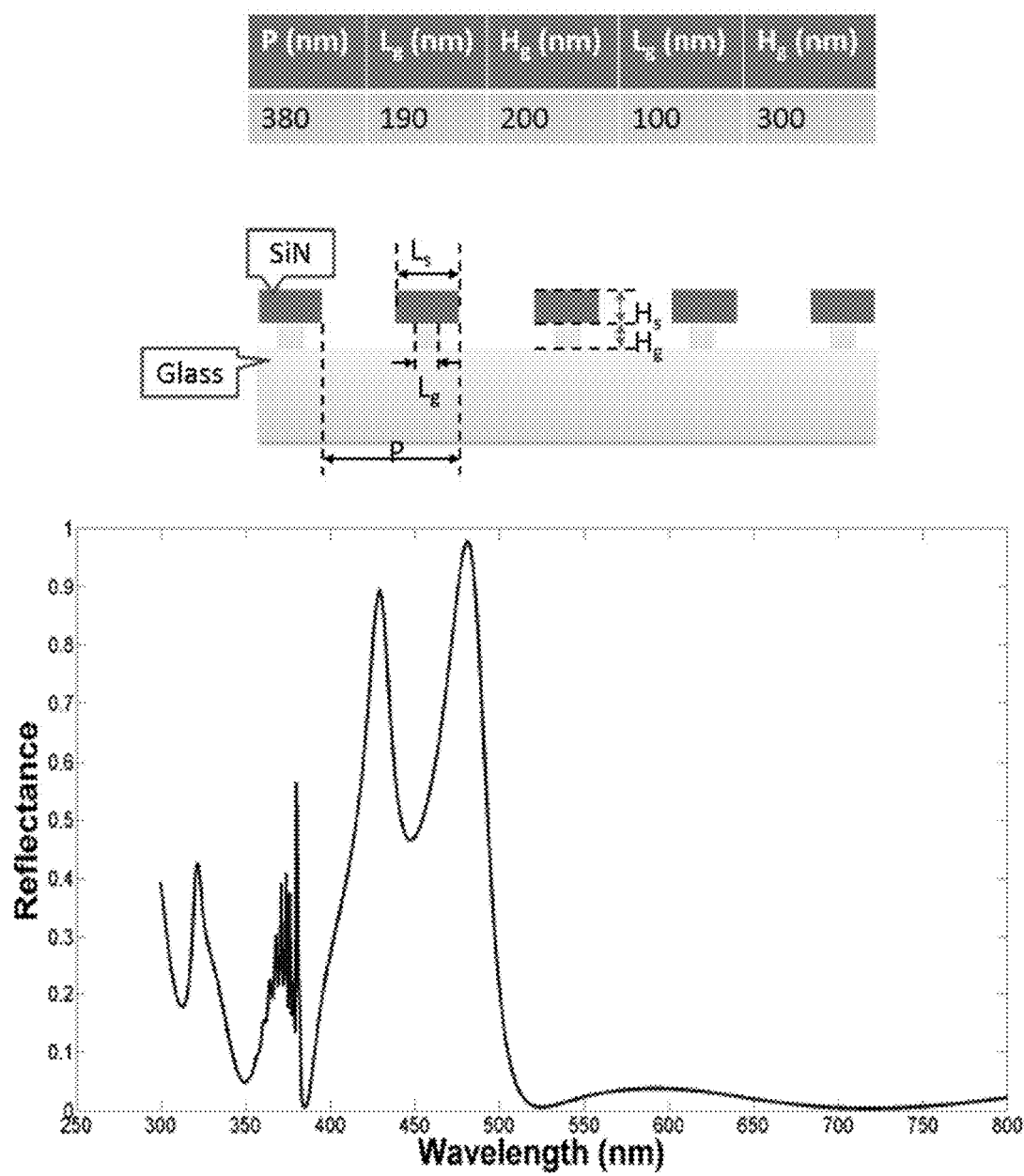

FIG. 4(a) shows the structure of an exemplary sub-wavelength high contrast grating/filter, and FIG. 4(b) shows different geometrical embodiments of the unit structure shown in the dashed box of FIG. 4(a); possible shapes include straight (e.g. rounded or square/rectangular rods), capped (e.g. having round/mushroom-shaped or square caps generally larger than the base), T-shaped (similar to capped in which the caps may be longer in one direction than another), or other possible shapes. FIG. 4(c) shows the geometric parameters and reflectance spectrum obtained with a T-shaped pillar unit structure in a blue color filter, with a FWHM of about 80 nm. FIG. 4(d) shows the geometric parameters for corresponding red and green filters compared to the blue filter. Changing properties such as the size and shape of the pillar units as well as the spacing between pillars changes the spectrum of the light that is reflected (and/or transmitted) by the grating.

Figure 5A:
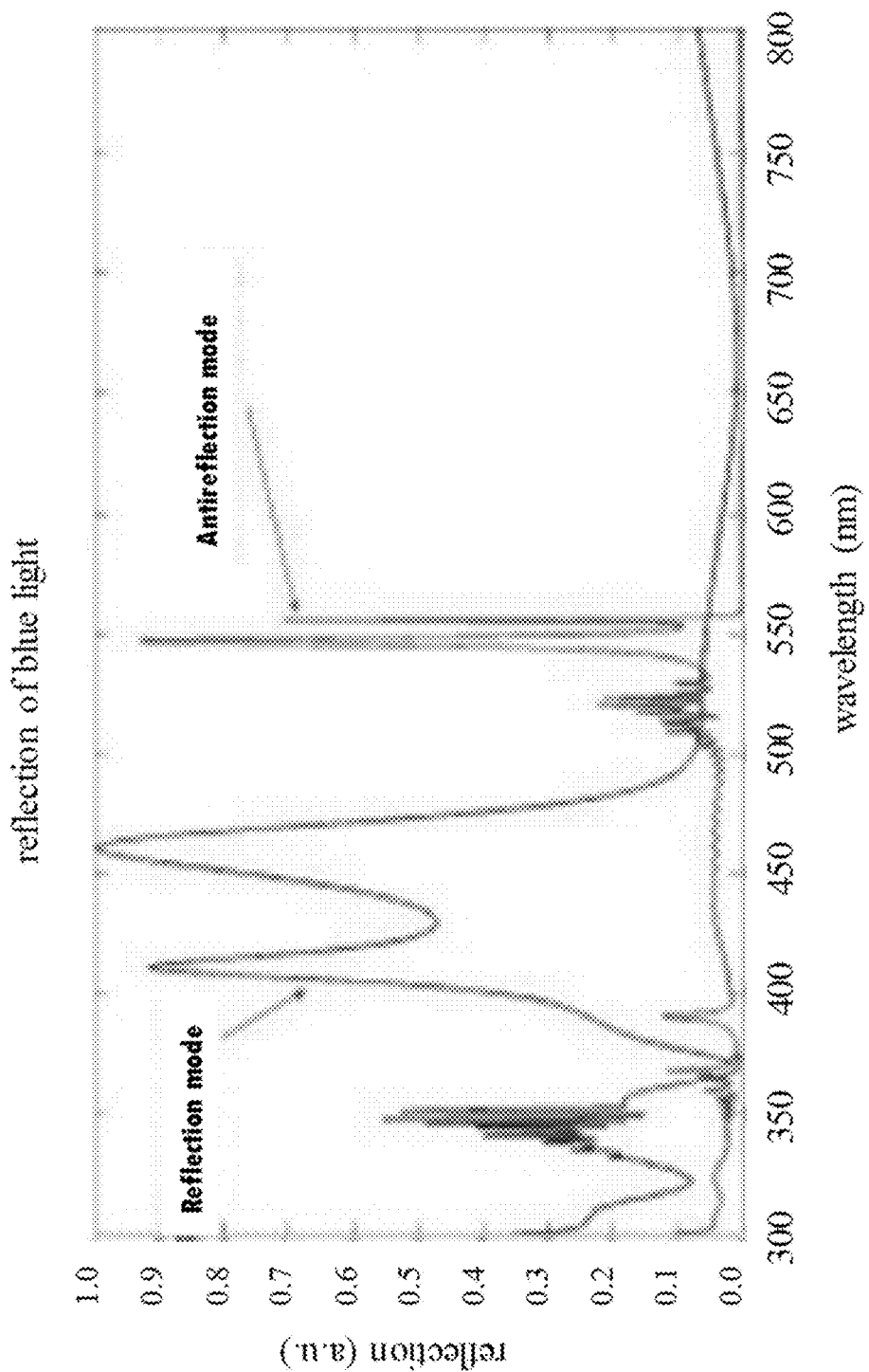
FIGS. 5(a)-5(d) shows reflection spectra from exemplary high contrast gratings.
Figure 5B:
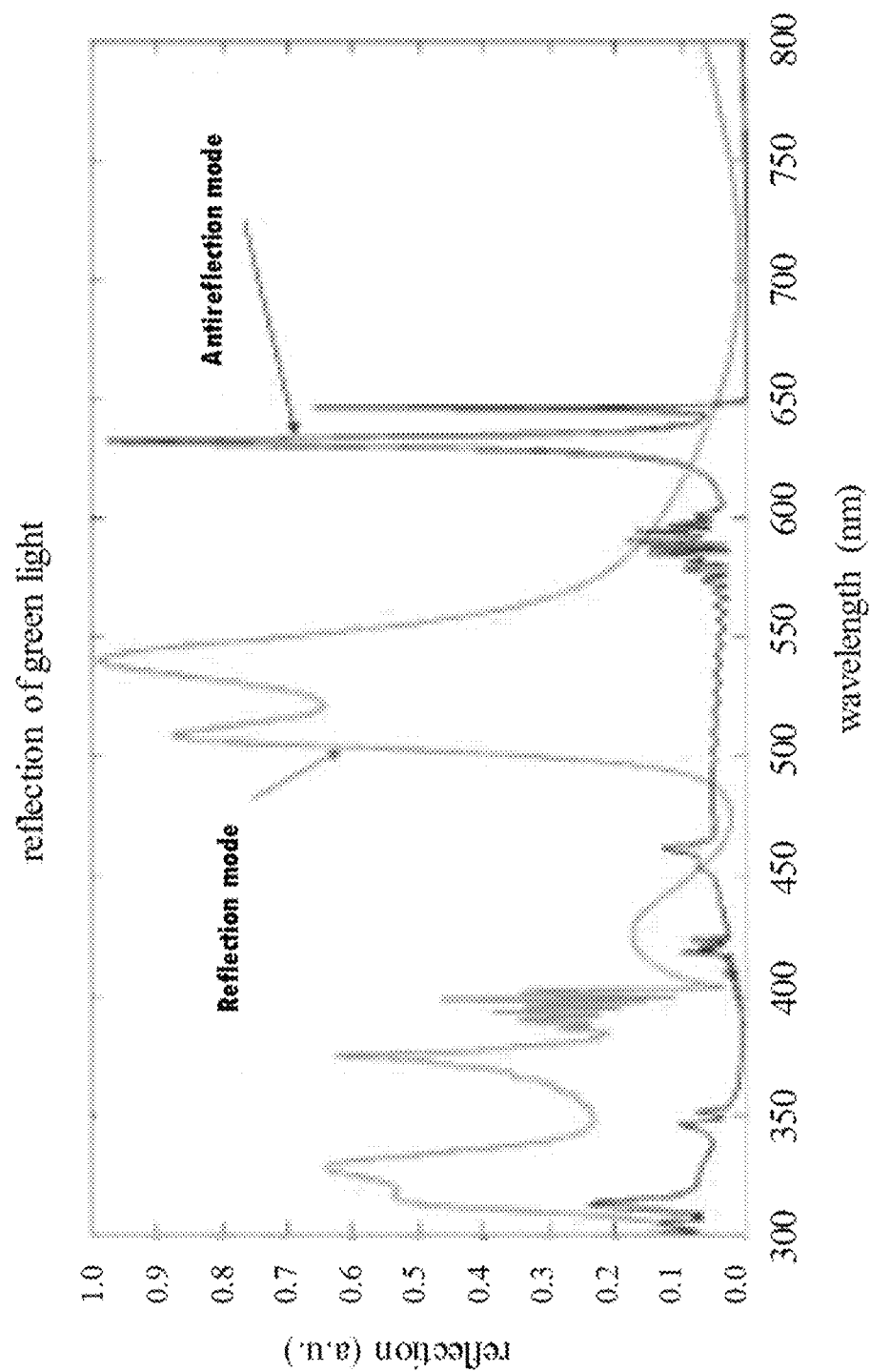
Figure 5C:
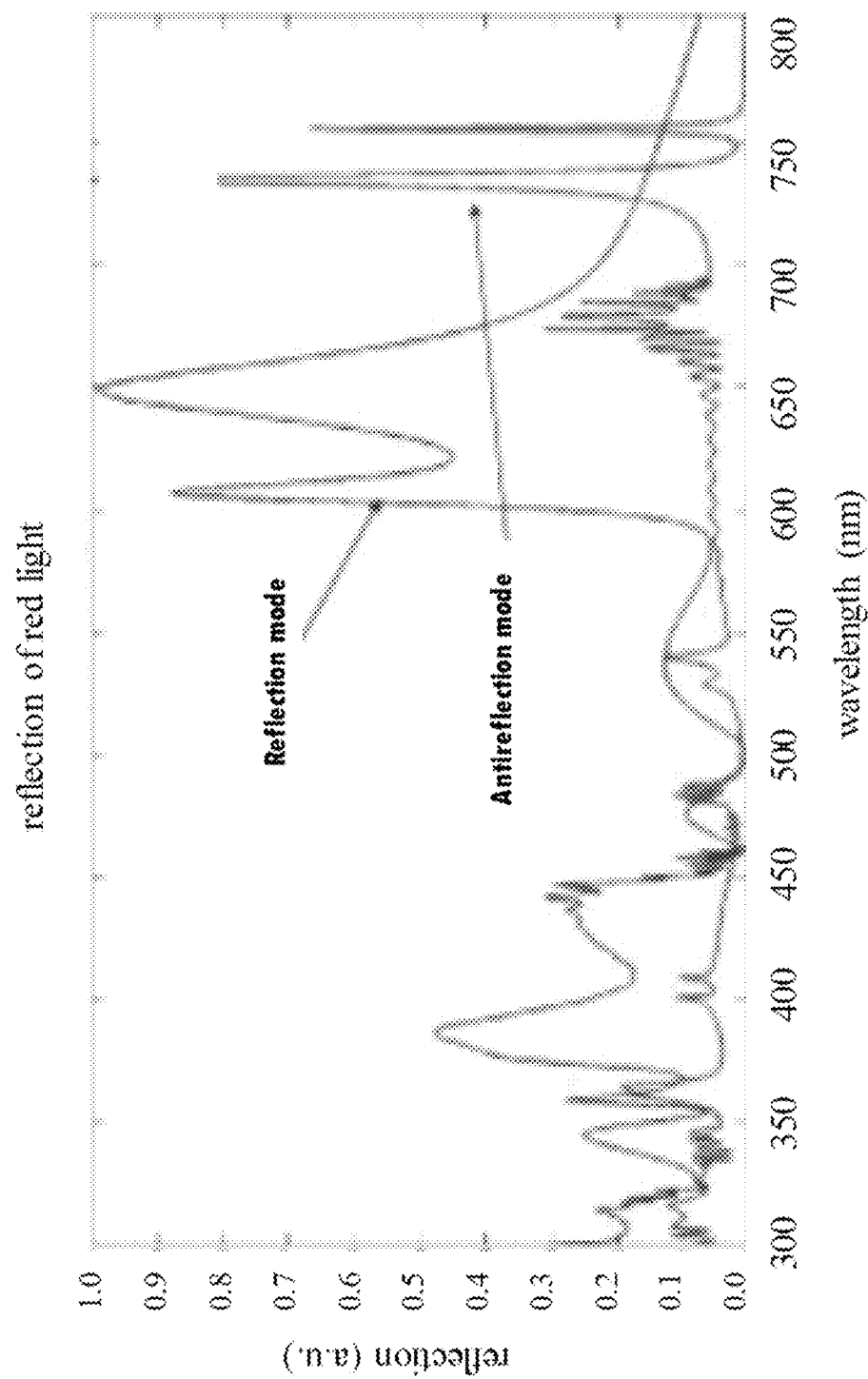
Figure 5D:
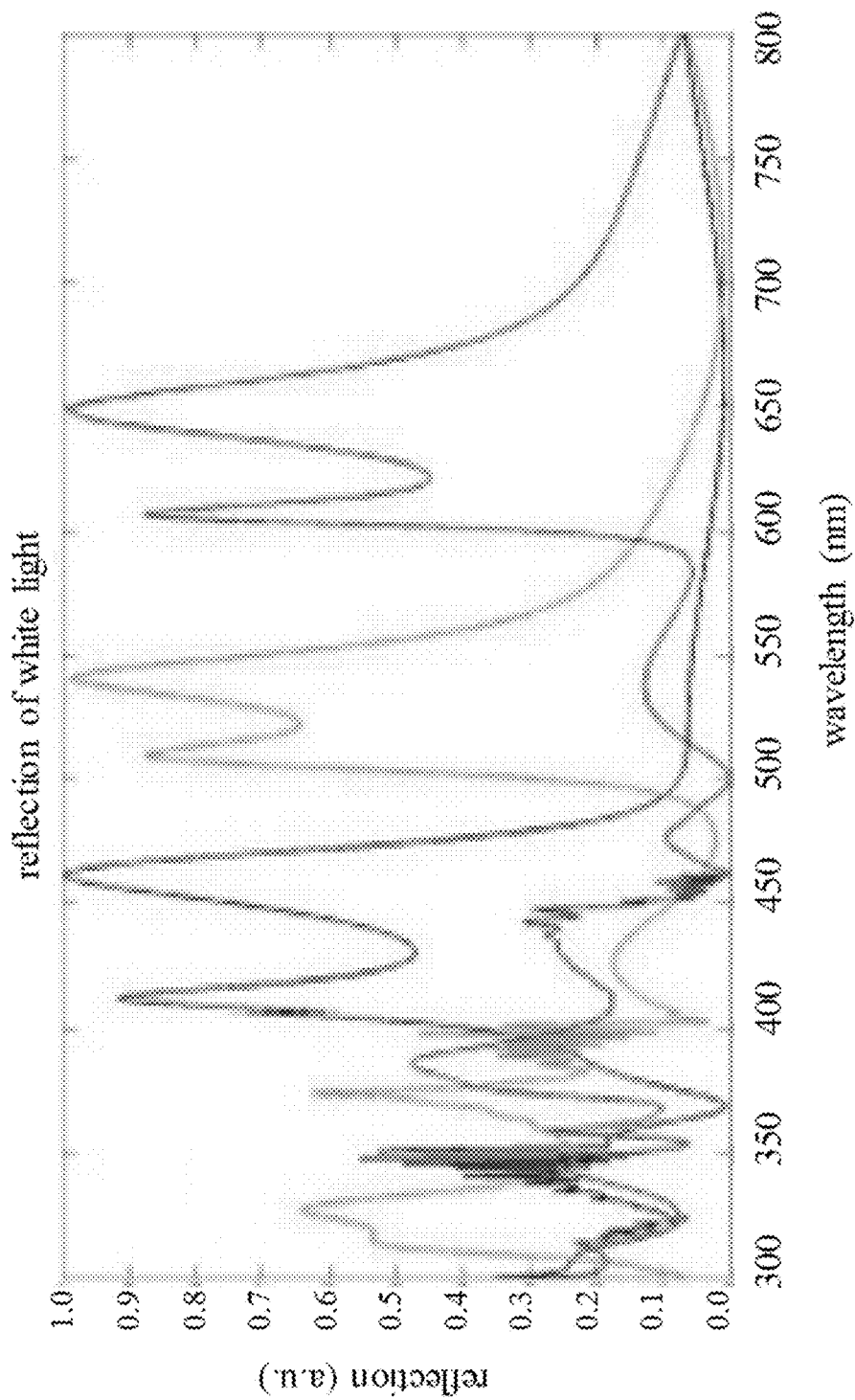

Accordingly, FIGS. 5(a)-5(d) shows an example of the reflection spectra of three types of sub-wavelength high contrast gratings with grating material of $Si_3N_4$ in both reflection and anti-reflection modes, surrounded by air. FIG. 5(a) shows the reflection spectrum for blue light in reflection mode and anti-reflection mode; FIG. 5(b) shows the reflection spectrum for green light in reflection mode and anti-reflection mode; FIG. 5(c) shows the reflection spectrum for red light in reflection mode and anti-reflection mode; and FIG. 5(d) shows the reflection spectrum for white light, showing that the combined reflectance spectra of the three gratings cover the visible portion of the spectrum. Depending on how each grating is modulated (e.g. to vary the amount of light reflected from each sub-pixel), the mixed light that is reflected from the pixel as a whole will thus produce different colors.

Figure 6:
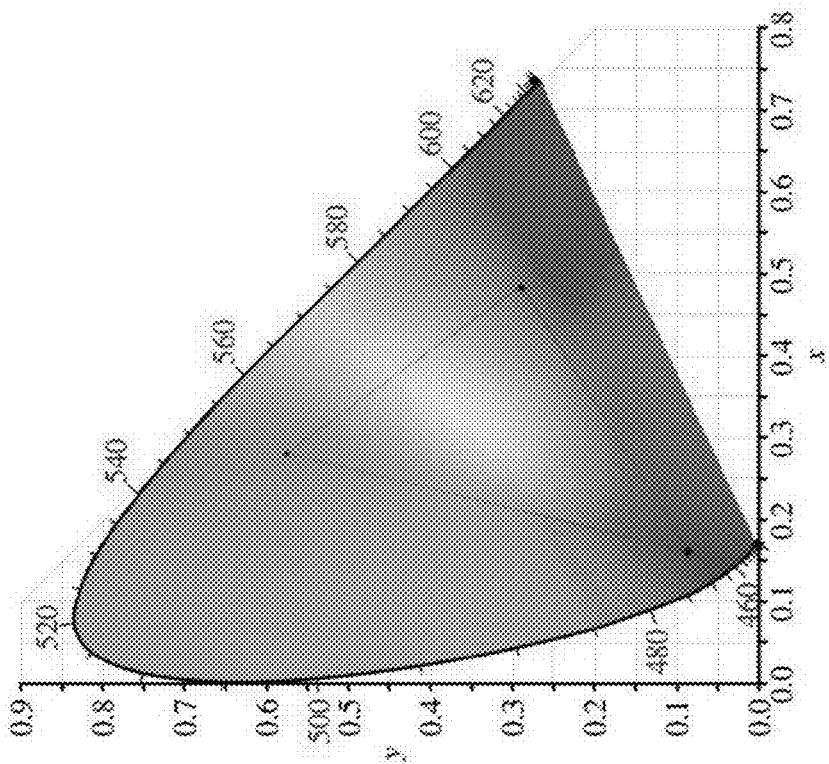
FIG. 6 shows two color gamuts obtained from simulations using exemplary $Si_3N_4$ high contrast gratings.
Figure 6:
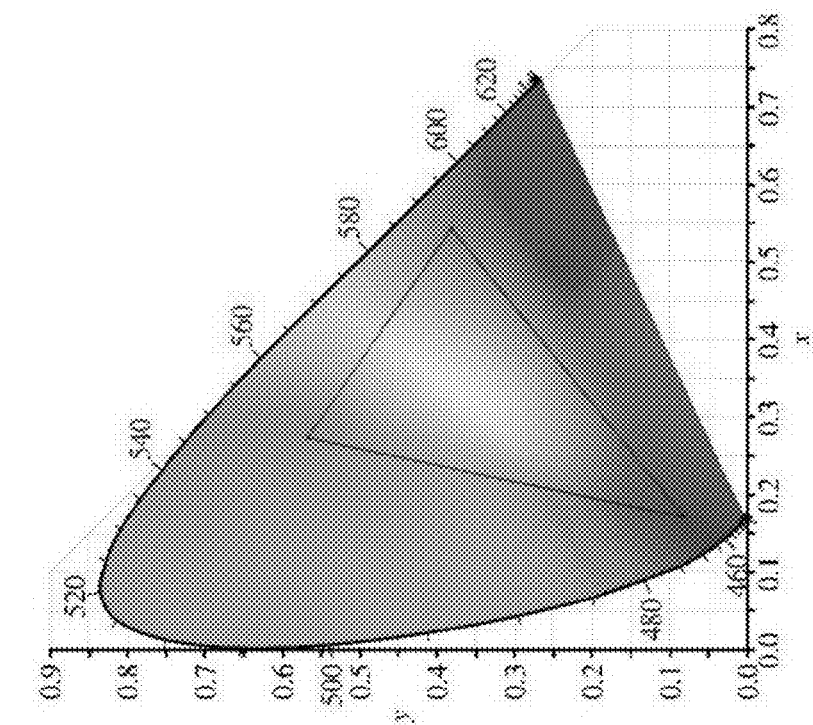

As noted above, the reflection spectrum of a grating is determined by the physical parameters of that grating. FIG. 6 shows two gamuts obtained from a simulation of sub-wavelength high contrast gratings with grating material of $Si_3N_4$. As is evident, the color space within the triangles shown varies depending on the parameters of the high contrast grating, including the materials used for the grating and its dimensions.

Figure 7:
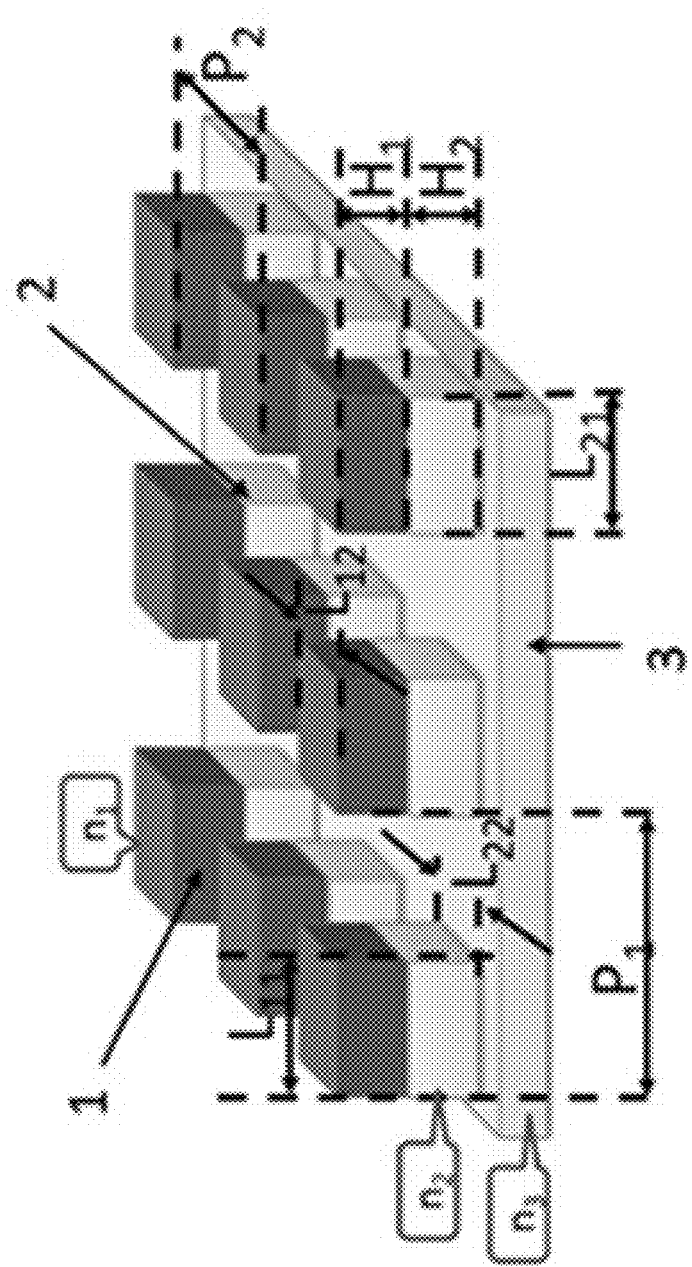
FIG. 7 is a schematic of a color filter based on an exemplary high contrast grating.

A schematic diagram of a high contrast grating for use as a color filter is shown in FIG. 7. The grating is a two-dimensional (2D) pillar array on a transparent quartz substrate, wherein each pillar within the grating consists of two layers, which are a top $TiO_2$ layer and a bottom quartz layer. In FIG. 7, the top (darker) layer of each pillar is made of a material 1 and the bottom (lighter) layer is made of material 2. Material 3 is the substrate of the grating. The terms $n_1$, $n_2$ and $n_3$ refer to the refractive index of material 1, material 2, and material 3, respectively. The terms $L_{11}$ and $L_{12}$ refer to the edge lengths of the upper (darker) layer, made of material 1, of each pillar. The terms $L_{21}$ and $L_{22}$ refer to the edge length of the lower (lighter) layer, made of material 2, of each pillar. The terms $H_1$ and $H_2$ refer to the height of the upper (darker) layer, made of material 1, of each pillar, and the lower (lighter) layer, made of material 2, of each pillar, respectively. The terms $P_1$ and $P_2$ refer to the pitch or periodicity (i.e. the spacing between the pillars) of the grating along the x and y axes of a plane defined by the substrate layer of material 3. In an embodiment, the pitch ranges between about 350 nm to about 550 nm, although greater or lesser pitch spacing is also possible. In various embodiments, the indices of refraction $n_1$, $n_2$ and $n_3$ are generally in the range of 1 to 3; and the edge lengths L, heights H, and pitch P are in the range of 10 nm to 1000 nm. For a given material, adjustment of these and other parameters can be made in order to tune the high contrast gratings to particular wavelength ranges, e.g. to produce blue, green, and red filters, by changing the centers and/or widths of the reflection spectra.

In certain embodiments, material 1, material 2 and material 3 may be the same material. In an embodiment, material 1 and 2 may be the same material and material 3 may be different materials. In some embodiments, multiple layers of material may be used in each pillar, or for the substrate, or for both. Material 1 is used for the top parts of the pillars, material 2 is for the bottom parts of pillars, while material 3 for the substrate. In various embodiments, material 1 is a material having a relatively high refractive index, including, for example, silicon nitride, titanium dioxide, and other dielectrics. In particular embodiments, material 1 may also be made from a combination of several different materials. In certain embodiments, material 2 may be glass or quartz, or may be made from the same material as the top parts of the pillars (i.e. the same as material 1). In some embodiments, material 3 may be quartz, glass, or other transparent materials. In other embodiments, the selection of materials 1, 2, and 3 are not limited to the above mentioned materials.

When light is incident on the grating, different modes are excited that result in resonance and reradiation of the light. Within a certain spectrum range, the transmitted light interferes destructively, causing the transmission of that light to disappear and a strong reflection to occur. This reflection spectrum is determined by the materials as well as the grating dimensions. For the upper layer of each pillar, $TiO_2$ was used because of its high reflective index and low loss in the visible spectrum range. In addition, a double-layer design was adopted in which the effective refractive index of the bottom quartz pillar layer is lower than its bulk counterpart. The above two design details together result in a color filter with a high-index contrast, yielding a high reflectance as well as a relatively broad FWHM. All of the unreflected incoming light is transmitted through the transparent quartz substrate and coupled to the underlying layers, while the reflected outgoing light from below is transmitted through the entire grating and is coupled out, which is important for the three-layer architecture illustrated in FIG. 1(a).

Figure 8:
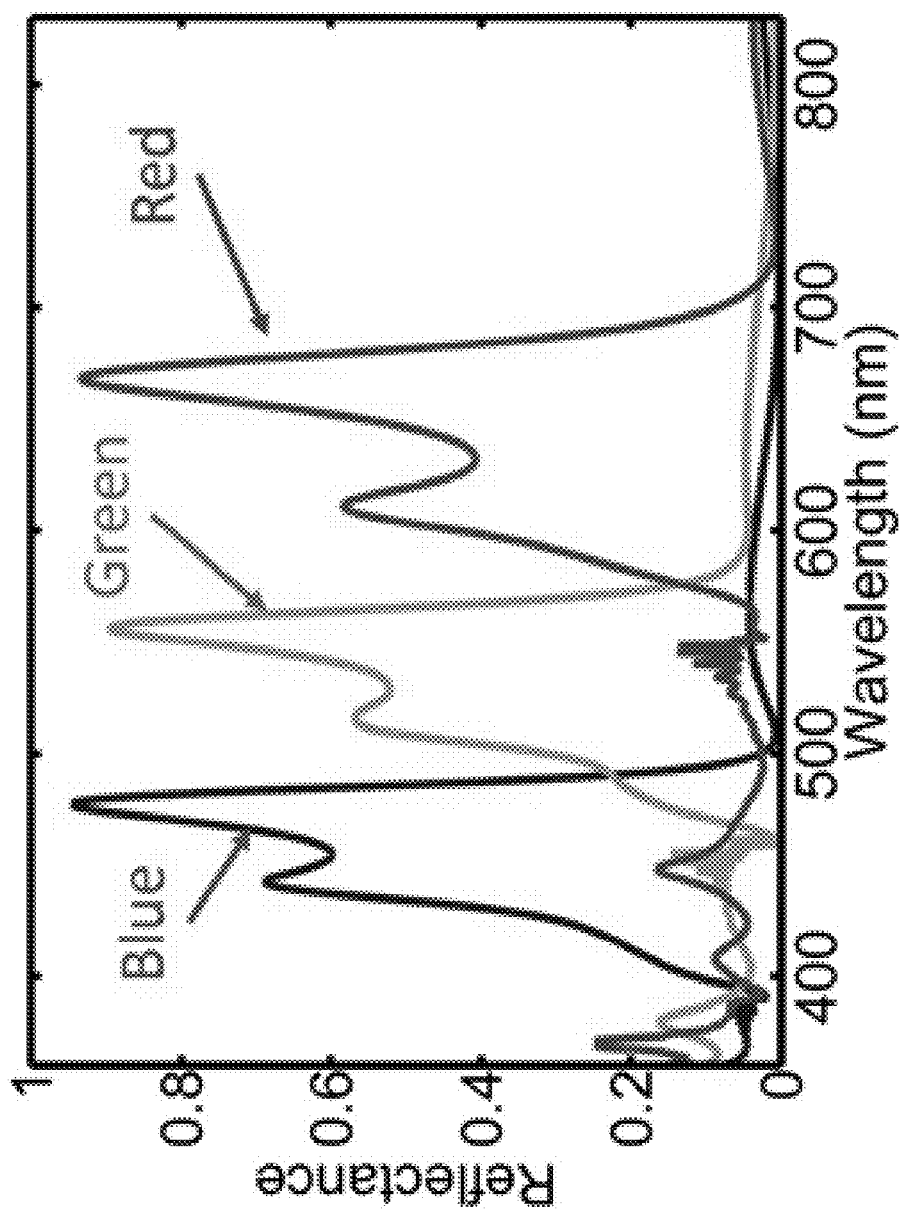
FIG. 8 is the reflection spectra of an exemplary high contrast grating color filter in the blue (labeled "Blue"), green (labeled "Green") and red (labeled "Red") spectral ranges.

The parameters determining the reflection spectrum of a grating include the grating period P, the grating pillar edge lengths $L_1$ and $L_2$ for the $TiO_2$ and quartz layers, respectively, and layer thicknesses $H_1$ and $H_2$ for the $TiO_2$ and quartz, respectively. Here, $L_1$ and $L_2$ were set to be identical to achieve a polarization-independent performance, and the length was therefore denoted as $L=L_1=L_2$. Numerical simulations were performed via the finite-difference time-domain (FDTD) method using commercial software (FDTD Solutions from Lumerical Solutions, Inc., Vancouver, Canada). Blue, green, and red filters were designed and their simulated reflection spectra under normal incident conditions are shown in FIG. 8. The reflection peak values of the blue, green, and red filters are 0.94, 0.89, and 0.83 with bandwidths having FWHM of 52, 60, and 82 nm, respectively.

Figure 9:
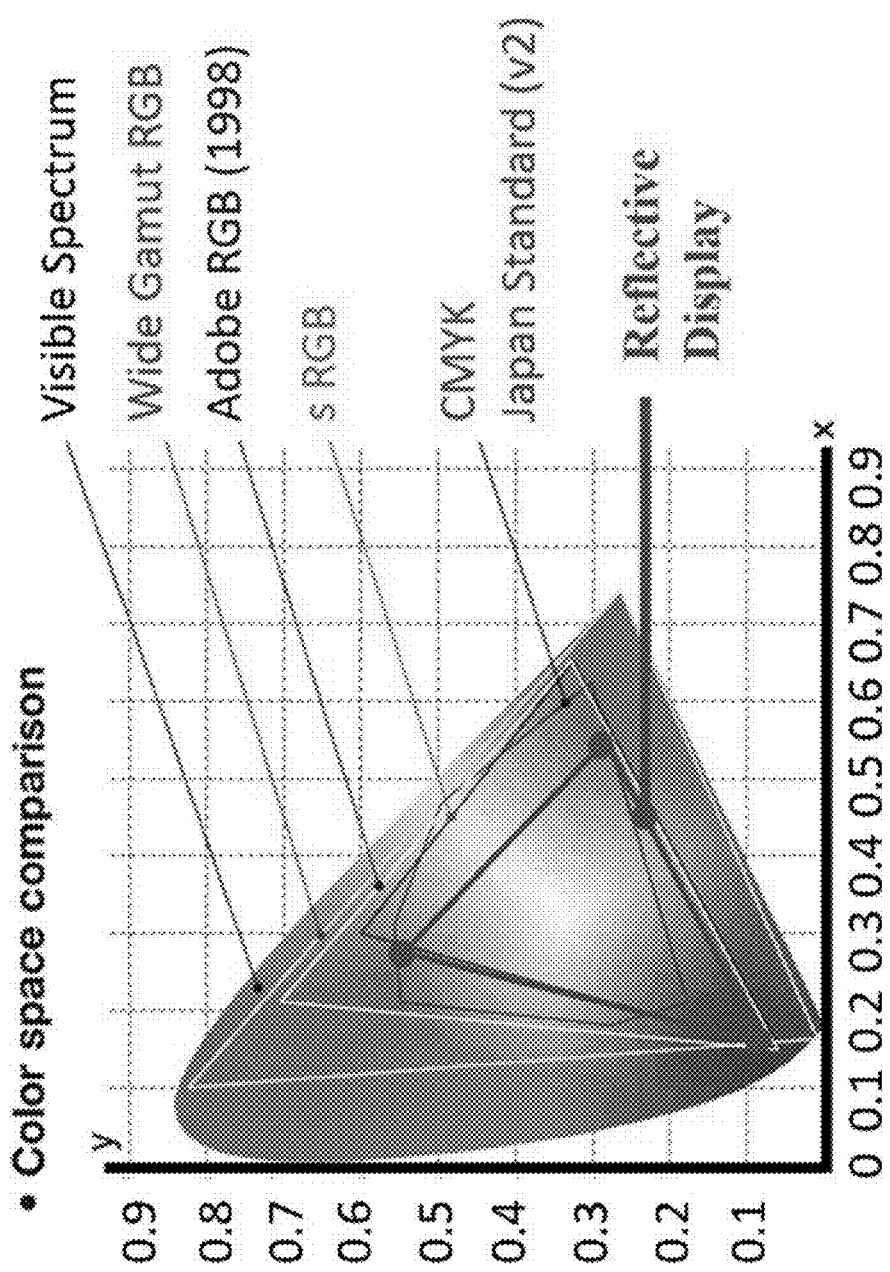
FIG. 9 is the color gamut using the CIE 1931 standard, showing the gamut achieved by an exemplary full color display, assuming normal incidence with a CIE illuminant C standard (shady daylight) and a normal viewing angle.

The corresponding color gamut of this reflective display is shown in FIG. 9, and several other standards are also drawn in the chromatic chart for reference. As can be seen, the inventive reflective display using these gratings has a reasonable gamut. Although the broadband red, green, and blue colors reduce the size of the color gamut, this broad bandwidth allows for a high reflection efficiency and hence a high brightness.

The gratings shown in FIGS. 4(a)-4(b) and 7 can be either 2-dimensional (as depicted, for example, in FIG. 7) or 1-dimensional. In the latter case, $L_{11}$ or $L_{12}$ is equal to P. The patterns of the gratings are also not limited to what is shown, as any grating pattern which enables the grating to reflect a particular color can be used. The patterns can also be hexagonal patterns, quasi-crystal patterns, or any periodic or non-periodic patterns. Likewise, the pillar element of the grating can have a variety of shapes, such as those depicted in FIG. 4(b).

Figure 10:
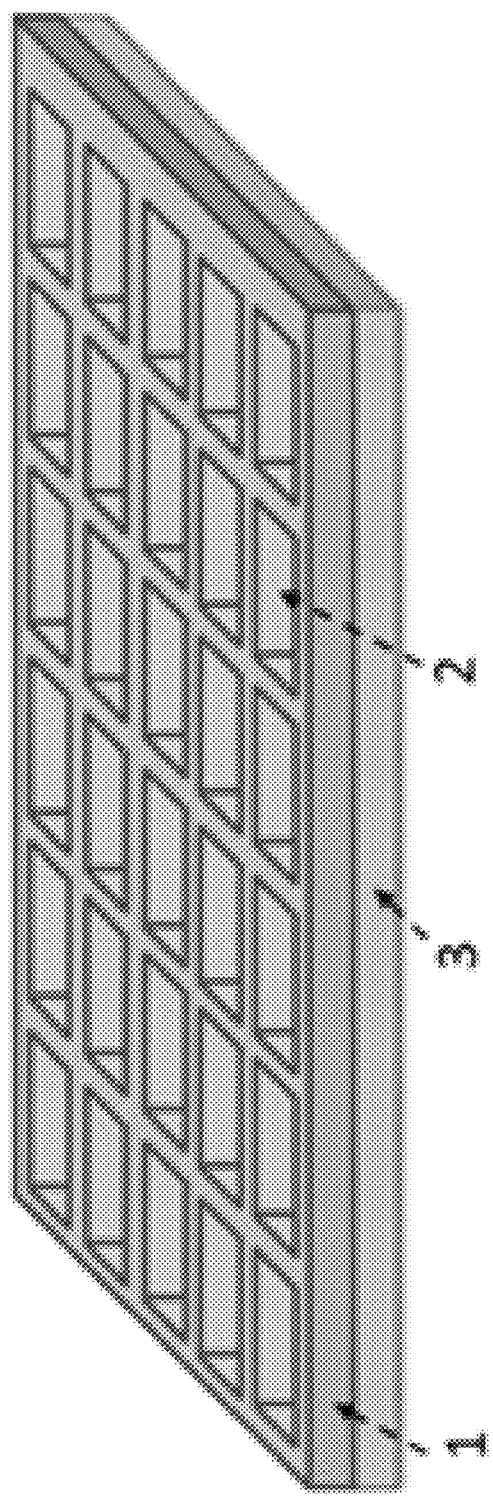
FIG. 10 is a schematic of an exemplary color filter based on a 2-dimensional hole array.

The grating can also be made of patterns of openings or holes in a material, as is illustrated in FIG. 10. The holes can be arranged in a variety of patterns, and the shapes of the holes may also be varied, such that the entire color filter can reflect a particular color or portion of the visible spectrum. In FIG. 10, the material numbered 1 is a material with a refractive index of $n_1$, the area numbered 2 is a hole, and the material numbered 3 is the substrate with a refractive index of $n_2$. In certain embodiments, the substrate is absent. In some embodiments, the color filter is made of multiple layers of 2-dimensional hole arrays. In an embodiment, a metallic structure can also be added to the color filter.

Figure 11:
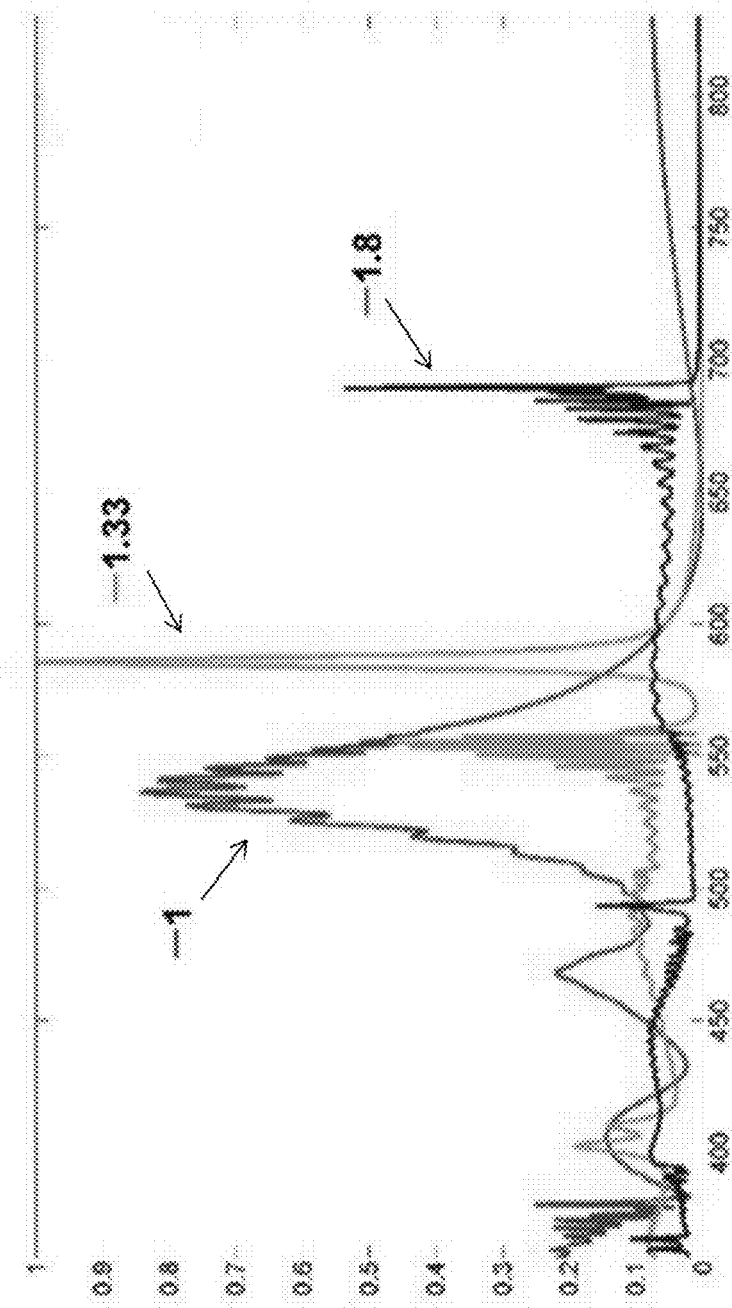
FIG. 11 is the reflection spectra of a series of exemplary high contrast grating color filters with material of different refractive indices as the surrounding environment of the color filter in order to achieve different reflection spectra as well as intensities. The spectrum shown in blue (labeled "1.8") has a substrate with a refractive index of 1.8; the spectrum shown in green (labeled "1.33") has a substrate with a refractive index of 1.33; and the spectrum shown in red (labeled "1") has a substrate with a refractive index of 1.

FIG. 11 shows the reflection spectra of the same high contrast grating coupled to a background (e.g. a liquid) made from materials with different indices of refraction. The spectrum with a maximum reflection peak around 530 nm is from a grating coupled to a background material having an index of refraction of 1.0. The spectrum with a maximum reflection peak around 590 nm is from a grating coupled to a background material having an index of refraction of 1.33. The spectrum with a maximum reflection peak around 690 nm is from grating coupled to a background material having an index of refraction of 1.8.

Figure 12:
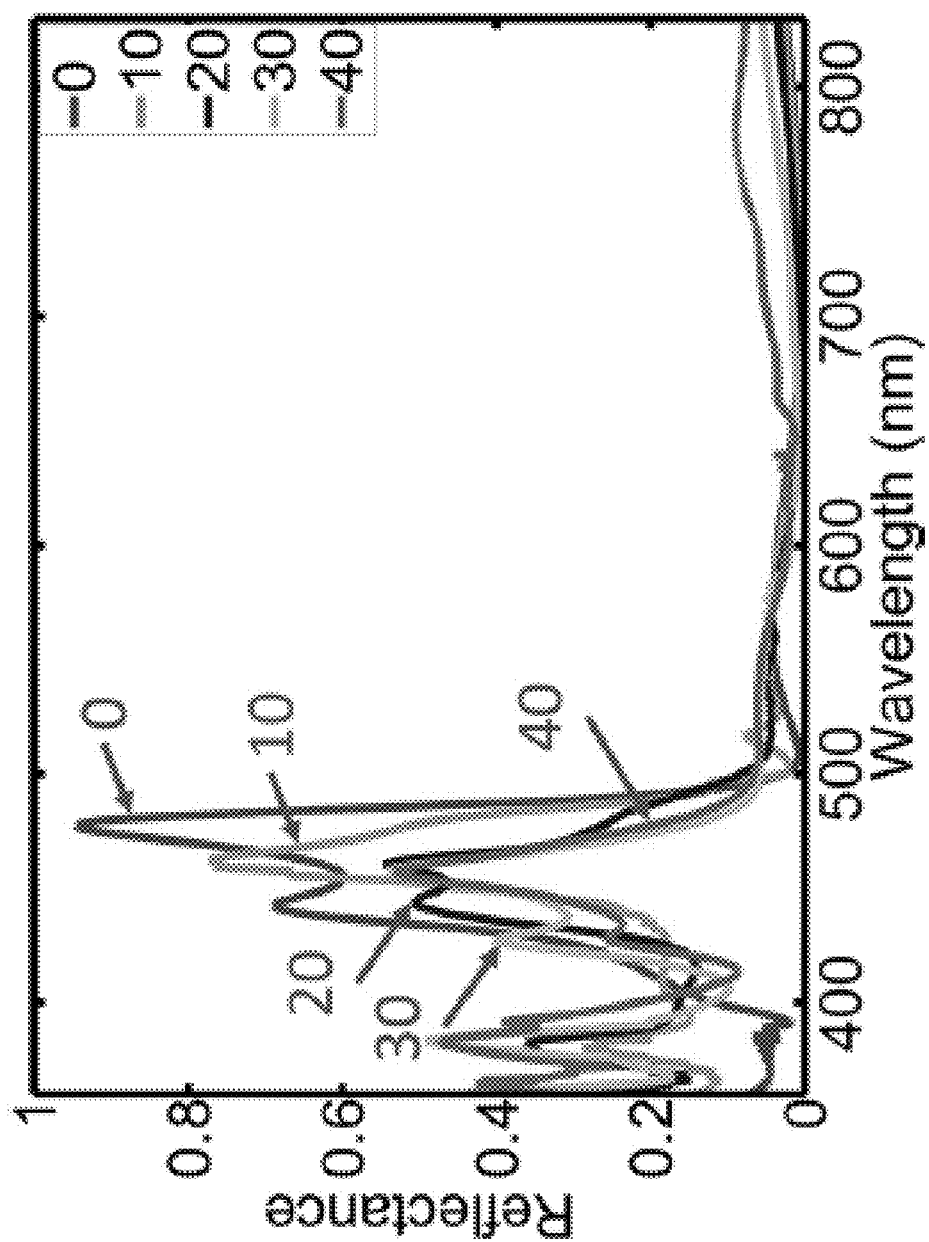
FIG. 12 is the reflection spectra of an exemplary high contrast grating under different incident angles.

The viewing angle dependence of the reflection spectrum has also been analyzed. Taking the blue filter as an example, the reflection spectra were calculated under different incident angles and plotted in FIG. 12. Specifically, the calculated angle-resolved reflection spectra of the blue filter at angles of 0°, 10°, 20°, 30°, and 40° are shown.

As can be seen, the reflection peak value reduces to half of the maxima with an incident angle of 40°. This result is acceptable considering the typical reading habits of individuals with a portable device, wherein the device can be easily adjusted to a satisfactory angle. The distribution of the color display with incident angles from 0° to 39° was further analyzed by calculation of the gamut, where it was found that within this incident angle range, the color remained in the blue region without much shift.

Because the reflectivity of the inventive displays is so high, and the reflection spectrum band can be designed with multiple degrees of freedom, a bigger gamut size results with judicious selection of the appropriate materials. The result is that colors are displayed more vividly than with other, conventional technologies.

The reflectivity of the inventive color displays results from the resonance modes in the sub-wavelength high contrast grating. Thus, the reflectivity can be tuned by partially or completely distorting these resonance modes. A variety of techniques may be used to tune the reflectivity of these gratings, including the use of electrowetting, interference cancellation resulting from the grating design, alternative grating designs, the use of phase change material, and MEMS.

Specifically, using electrowetting technology, a drop of liquid can selectively be put in contact with the grating or not. The resonance modes in that grating will be distorted or eliminated when the grating is in contact with the liquid, hence the reflectivity of the pixel or sub-pixel comprising the grating can be controlled. When using a quasi-double layer grating design, a pi phase shift can be introduced when liquid is in contact with the structure, resulting in cancellation of the zero order of the reflection in addition to distortion of the resonance modes. A free standing 2-dimensional (2D) net grating (e.g. as shown in FIG. 10, without use of a substrate) can be used to reflect the light, which can provide a better performance due to an improved design. And finally, the resonance modes within the grating itself can be distorted by changing the phase of a "phase shift material" layer in the grating structure or by using a MEMS structure. These various embodiments are described more fully below.

Figure 13A:
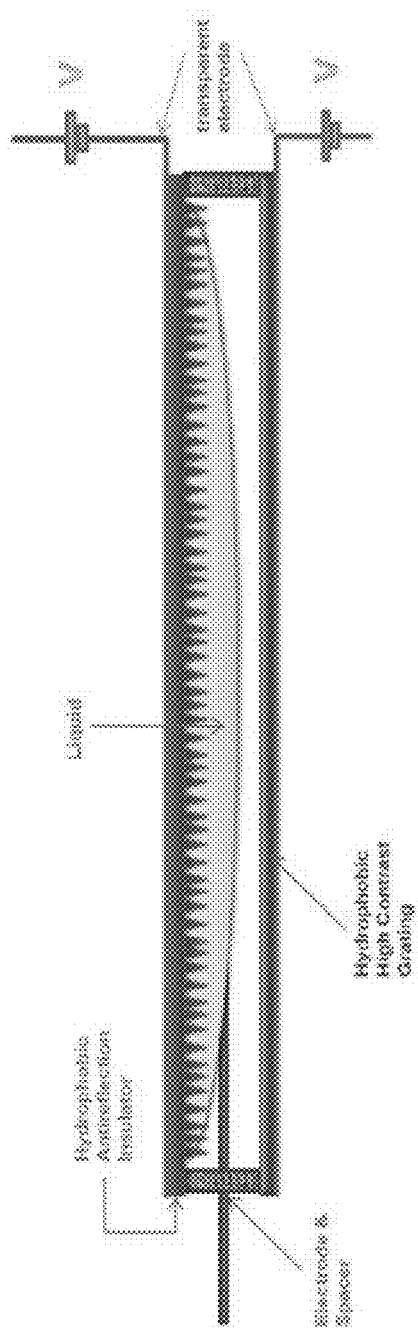
FIGS. 13(a)-13(b) are a schematic of one embodiment of a tunable sub-pixel in various reflective states.
Figure 13B:
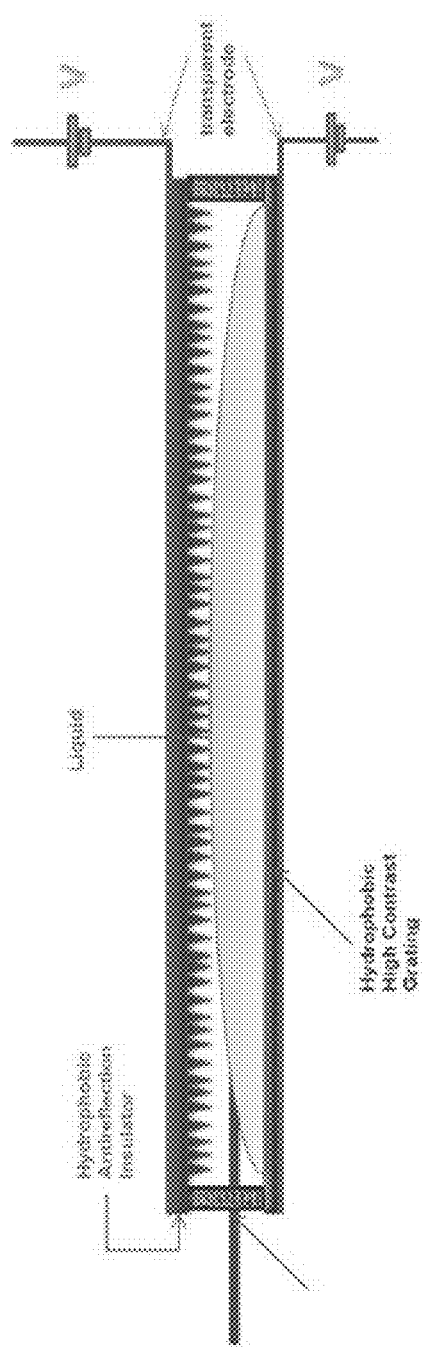

The structure of an embodiment of a sub-pixel comprising a color filter which is tuned using electrowetting techniques is shown in FIGS. 13(a)-13(b). A drop of liquid is located between the upper layer (which may, in certain embodiments, be a hydrophobic antireflection layer) and the lower layer (which may, in certain embodiments, be a hydrophobic high contrast grating). The relative position of the drop in relation to the components of the sub-pixel can be controlled by electrowetting, i.e. by a voltage applied across the transparent electrodes shown in FIGS. 13(a)-13(b), thus the drop can be either in contact with the hydrophobic antireflection layer or the hydrophobic high contrast grating layer.

Blue light will be used as an example to illustrate the basic principle of tuning of the color filter using electrowetting techniques. When a voltage is applied to the upper electrode and the lower electrode is grounded, as shown in FIG. 13(a), the liquid will be absorbed by the upper layer and be held away from the lower (grating) layer. In this situation, the high contrast grating layer will reflect blue light intensively, while green and red light are transmitted. However, when the upper electrode is grounded and the voltage is instead applied to the lower electrode, the liquid drop will be in contact with the grating, and the resonance modes in the grating are distorted. In the extreme condition, this sub-pixel will not reflect blue light any more, and all the light will be transmitted. The sub-pixel structures for green and red light are the same; the only difference is the grating parameters, which are designed to reflect blue, green and red light, respectively. Three layers (i.e. one each of red, green and blue light) can either be stacked together or arranged in parallel to achieve a full color display.

Figures 14A, 14B, 14C:
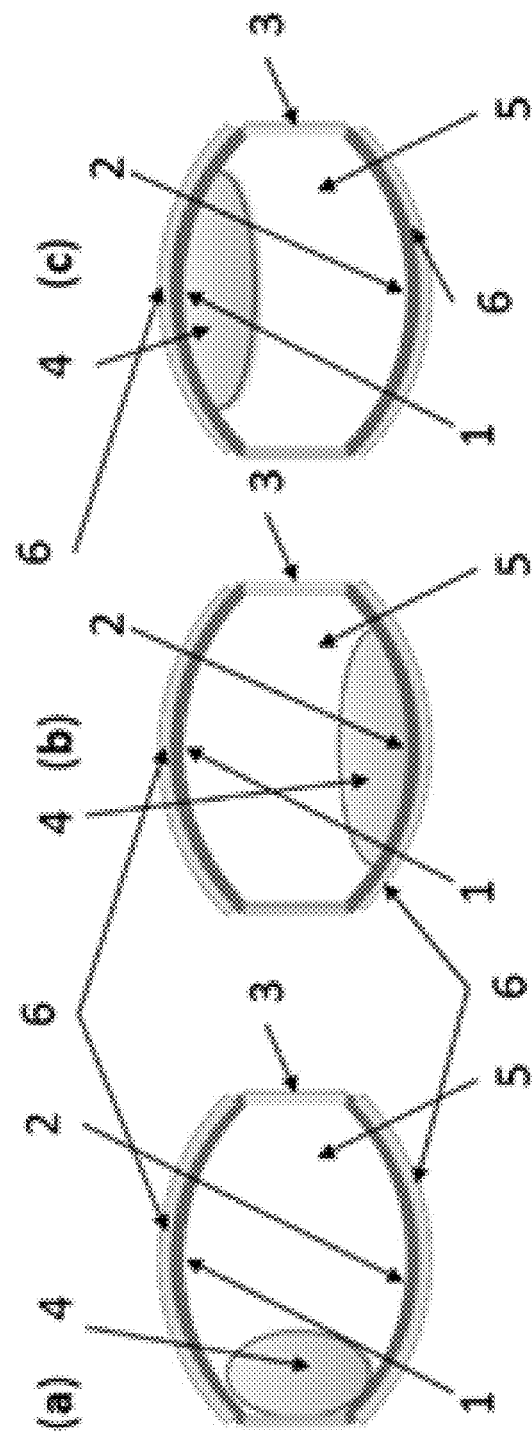
FIGS. 14(a)-14(c) are a schematic of an additional embodiment of a tunable sub-pixel in various reflective states.

An additional embodiment of a sub-pixel comprising a color filter which may be tuned using electrowetting techniques is shown in FIGS. 14(a)-14(c). In FIGS. 14(a)-14(c), the element numbered 1 is a substrate, which may be transparent and/or hydrophobic. The element numbered 2 is a color filter, which may be a high contrast grating, and may be hydrophobic. Element 3 is a sidewall of the sub-pixel which a height of $H_S$. In an embodiment, the height $H_S$ of the sidewall may be zero (i.e. there is no sidewall). In certain embodiments, the side wall may serve as an electrode. Element 4 is liquid 1 with a refractive index of $n_1$. Element 5 is liquid 2 or a gas, which a refractive index of $n_2$. Element 6 is a transparent electrode. In an embodiment, a magnified cross-section through elements 6 and 2, shown as a lower layer in FIGS. 14(a)-14(c), may include the pillars making up a high contrast grating of layer 2 resting upon transparent substrate layer 6.

By controlling the degree of contact between the liquid and the high contrast grating, different amounts of blue light can be reflected. In FIG. 14(a) and FIG. 14(c), the contact area between the grating and the liquid 1 is small, so the sub-pixel may reflect a particular color (such as blue). In FIG. 14(b), the contact area is large and the sub-pixel may reflect less blue light and become transparent. The amount of reflected blue light can be controlled by the amount of contact area. The movement may be controlled by electrowetting or a different technique. In certain embodiments, elements 4 and 5 may both be liquids, or may both be gases, or may be one gas and one liquid. In various embodiments, the upper and lower surfaces (e.g. including the transparent electrode and the high contrast grating, respectively) may be substantially planar (e.g. as shown in FIGS. 13(a)-13(b)) or may be curved or rounded (e.g. as shown in FIGS. 14(a)-14(c)). In certain embodiments, the upper and/or lower surfaces may be either be flat, round, or any other complex shape. The non-flat surface may provide a diffusive reflection, which can provide a user with a more "paper-like" experience when viewing the screen.

Figures 15A, 15B:
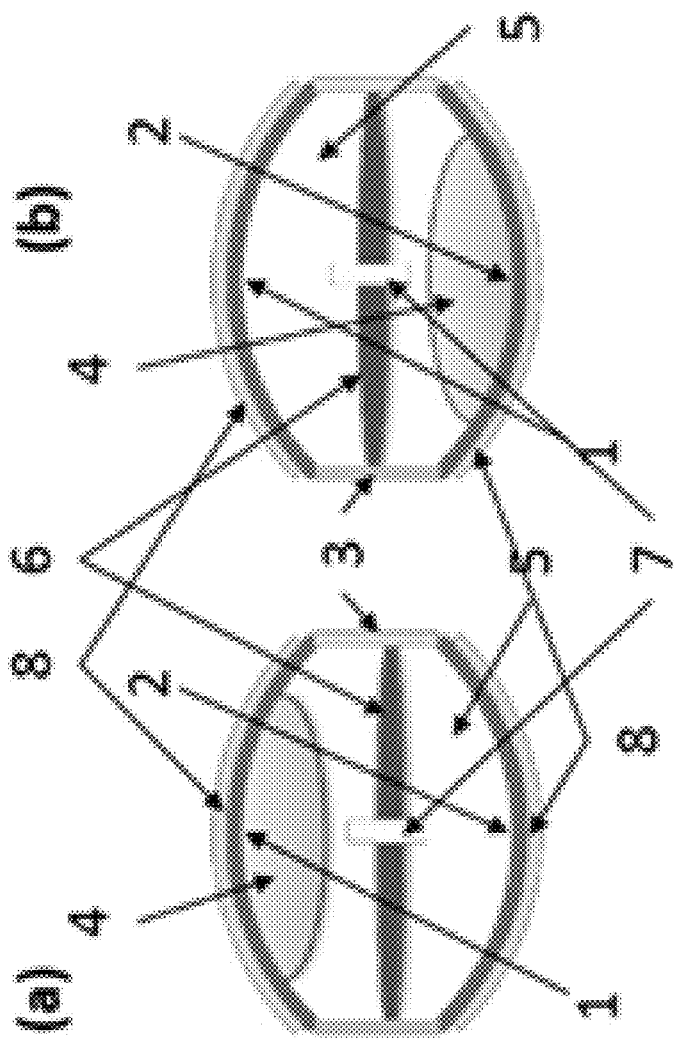
FIGS. 15(a)-15(b) are a schematic of a further embodiment of a tunable sub-pixel in various reflective states.

A further embodiment of a sub-pixel comprising a color filter which may be tuned using electrowetting techniques is shown in FIGS. 15(a)-15(b). In FIGS. 15(a)-15(b), the element numbered 1 is a substrate, which may be transparent and/or hydrophobic. The element numbered 2 is a color filter, which may be a high contrast grating, and may be hydrophobic. Element 3 is a sidewall of the sub-pixel which a height of $H_S$. In an embodiment, the height of the sidewall is zero (i.e. there is no sidewall). In certain embodiments, the side wall may serve as an electrode. Element 4 is liquid 1 with a refractive index of $n_1$. Element 5 is liquid 2 or a gas, which a refractive index of $n_2$. Element 6 is a substrate, which may be a transparent electrode, which separates the sub-pixel into two channels. Element 7 is a pore in the substrate 6. Element 8 is a transparent electrode.

Similar to FIGS. 14(b)-14(c), the sub-pixel of FIGS. 15(a)-15(b) shows two states, shown in FIG. 15(a) and FIG. 15(b) respectively, and the reflection spectra of the sub-pixel depends upon the contact area between the color filter and a liquid. In FIG. 15(a), the liquid is predominantly inside the upper channel and the contact area is small, resulting in (for example), the sub-pixel reflecting blue light. In FIG. 15(b), the liquid is predominantly in the lower channel and the contact area is large, resulting in the blue light becoming less reflected and more transparent.

The structure shown in FIGS. 15(a)-15(b), in which two channels or compartments are built inside one sub-pixel and a liquid can be driven between these two channels through the pores in the middle substrate, can be viewed as a variation of the sub-pixel structure of FIGS. 14(a)-14(c). Other variants may also be constructed, provided that the contact area between a liquid and the color filter/reflector can be controlled. For example, three or more channels can also be built inside one sub-pixel.

Figures 16A, 16B:
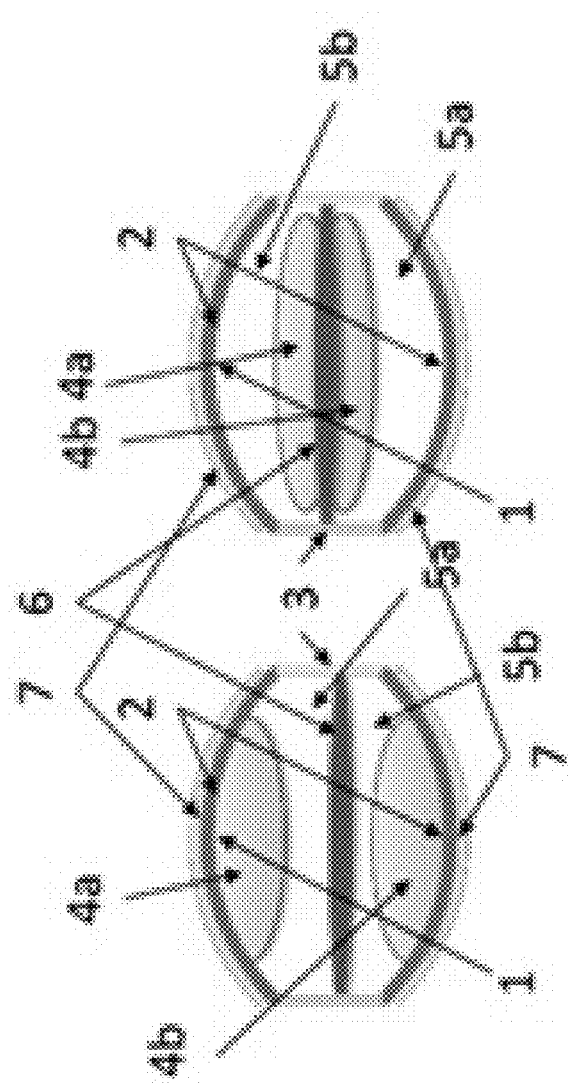
FIGS. 16(a)-16(b) are a schematic of yet a further embodiment of a tunable sub-pixel in various reflective states.

Yet a further embodiment of a sub-pixel comprising a color filter which may be tuned using electrowetting techniques is shown in FIGS. 16(a)-16(b). In FIGS. 16(a)-16(b), the element numbered 1 is a substrate, which may be transparent and/or hydrophobic. The element numbered 2 is a color filter, which may be a high contrast grating, and may be hydrophobic. Element 3 is a sidewall of the sub-pixel which a height of $H_S$. In an embodiment, the height of the sidewall is zero (i.e. there is no sidewall). In certain embodiments, the side wall may serve as an electrode. Element 4a is liquid 1a with a refractive index of $n_{1a}$. Element 4b is liquid 1b with a refractive index of $n_{1b}$. Element 5a is liquid 2a or a gas, which a refractive index of $n_{2a}$. Element 5b is liquid 2b or a gas, which a refractive index of $n_{2b}$. Element 6 is a substrate, which may be a transparent electrode, and which may not be present. Element 7 is a transparent electrode.

Similar to FIGS. 15(a)-15(b), the sub-pixel of FIGS. 16(a)-16(b) shows two states, shown in FIG. 16(a) and FIG. 16(b) respectively, and the reflection spectra of the sub-pixel depends upon the contact area between the color filter and the liquid or gas 1a and/or 1b. In this embodiment, multiple color filters may be present, and liquids 1a and 1b may be the same or different. Additionally, the liquids 2a and 2b may be gases, or one may be a gas and the other a liquid.

The use of multiple layers of color filters in a single sub-pixel will increase the reflected color brightness and/or saturation. FIGS. 16(a)-16(b) show a sub-pixel with two layers of color filter/reflectors, but more layers can be used in one sub-pixel, and the color filters can be integrated to any surface of the sub-pixel. For example, the color filter may be located in the middle of the pixel, as is shown in FIGS. 17(a)-17(b).

Figures 17A, 17B:
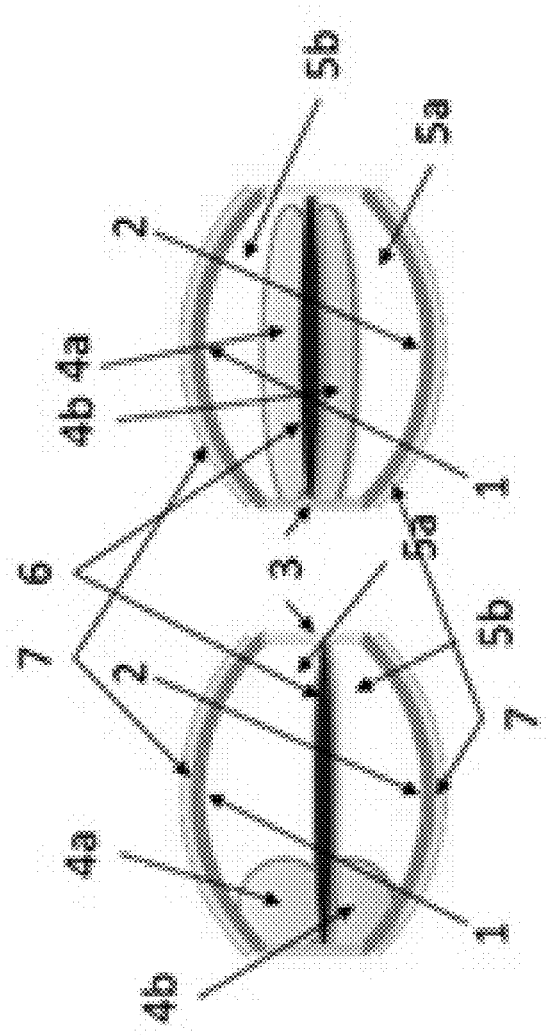
FIGS. 17(a)-17(b) are a schematic of still a further embodiment of a tunable sub-pixel in various reflective states.

FIGS. 17(a)-17(b) show an embodiment of a sub-pixel comprising a tunable color filter which comprises a free-standing high contrast grating net structure. In FIGS. 17(a)-17(b), the elements numbered 1 and 2 are substrates, which may be transparent and/or hydrophobic. Element 3 is a sidewall of the sub-pixel which a height of $H_S$. In an embodiment, the height of the sidewall is zero (i.e. there is no sidewall). In certain embodiments, the side wall may serve as an electrode. Element 4a is liquid 1a with a refractive index of $n_{1a}$. Element 4b is liquid 1b with a refractive index of $n_{1b}$. Element 5a is liquid 2a or a gas, which a refractive index of $n_{2a}$. Element 5b is liquid 2b or a gas, which a refractive index of $n_{2b}$. Element 6 is a free standing net structure which can be hydrophobic, and which may be coated with an electrode layer. Element 7 is a transparent electrode. In some embodiments the liquids 4a, 4b may move through the openings in the free standing net structure. In other embodiments in which the liquids 4a, 4b do not move through the openings in the free standing net structure, the reflection spectrum/intensity can also be tuned to particular wavelength ranges.

The liquid and/or gases inside the exemplary sub-pixels of FIGS. 13(a)-17(b) can also be controlled to flow laterally, to provide a range of contact areas with the grating layer in different states, providing an additional way in which to tune the reflectivity of the unit (e.g. to adjust the range of wavelengths and/or the intensity of the light that is reflected).

Although the tunable sub-pixels of FIGS. 13(a)-17(b) were described in the context of electrowetting, any suitable technique may be used to effect the change in contact between a material which is capable of changing the refractive index of light transmitted and/or reflected through the sub-pixel, and the color filter. For example, in some embodiments the sub-pixels may be heated to change the liquid into vapor, thus changing the refractive index.

Figure 18:
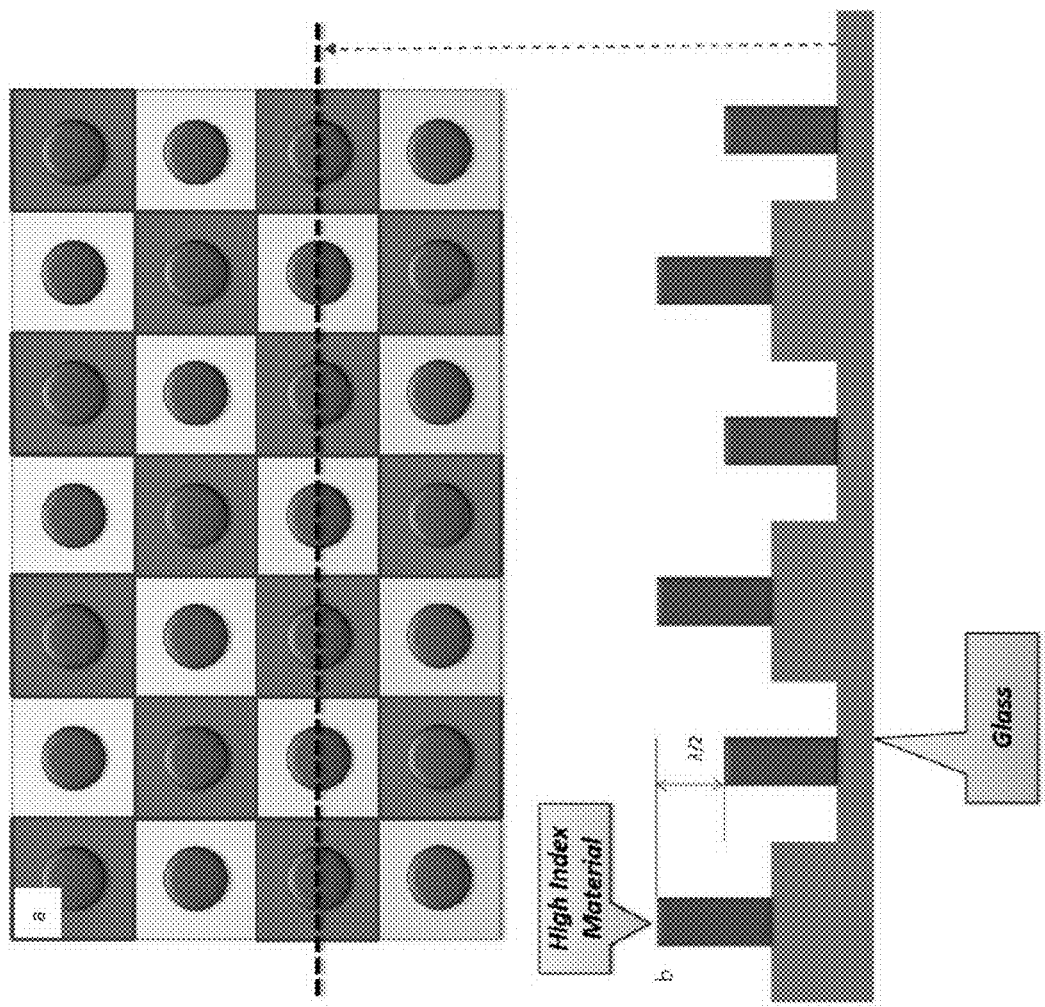
FIG. 18 is a schematic of an exemplary quasi-double layer high contrast grating. The upper panel shows a top view of the grating, and the lower panel shows a cross-section through the grating along the dashed line in the upper panel.

In certain embodiments, a quasi-double layer grating as shown in FIG. 18 is used to reflect a single color of light. The grating in FIG. 18 is achieved by disposing the pillars (which may themselves have an approximately uniform height) on portions of the substrate having different heights. The alternate elevation grating pillars, as seen in the lower panel, have an elevation difference of one half of the corresponding wavelengths. Without liquid, the phase change of adjacent grating pillars is $2\pi$, and the reflected light from different layers will interfere constructively. If liquid with a refractive index of 1.5 is in contact with the grating shown in the upper panel, the phase change will become $\pi$, and the interference will become destructive.

These quasi-double layer gratings may be used with any of the sub-pixels or methods described above, for example as shown in FIGS. 13(a)-17(b). Combined with the resonance distortion effects mentioned above, the reflectivity of a sub-pixel using a quasi-double layer grating and electrowetting techniques will be further reduced as compared to a sub-pixel with a standard high contrast grating.

Figure 19:
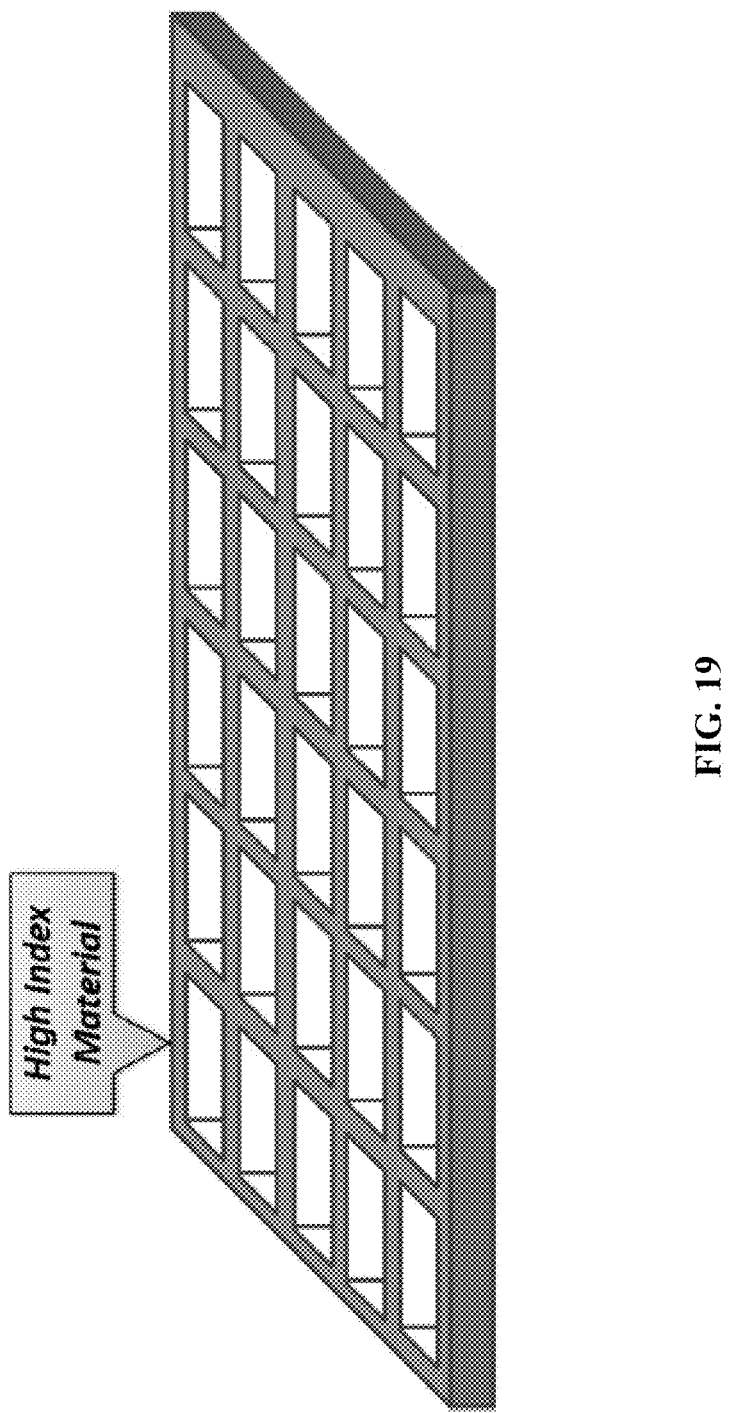
FIG. 19 is a schematic of an exemplary 2-dimensional net grating.

In some embodiments, the high contrast gratings which include a 2D array of pillars may be replaced by 2D net structures as shown in FIG. 19. Such a 2D net structure can be free standing (i.e. without a substrate), which are predicted to provide better reflection than the pillar gratings. Such 2D net structures can be designed to reflect blue, green and red light, respectively. These 2D net structures may also be used with any of the sub-pixels or methods described above, for example as shown in FIGS. 13-18.

Figure 20:
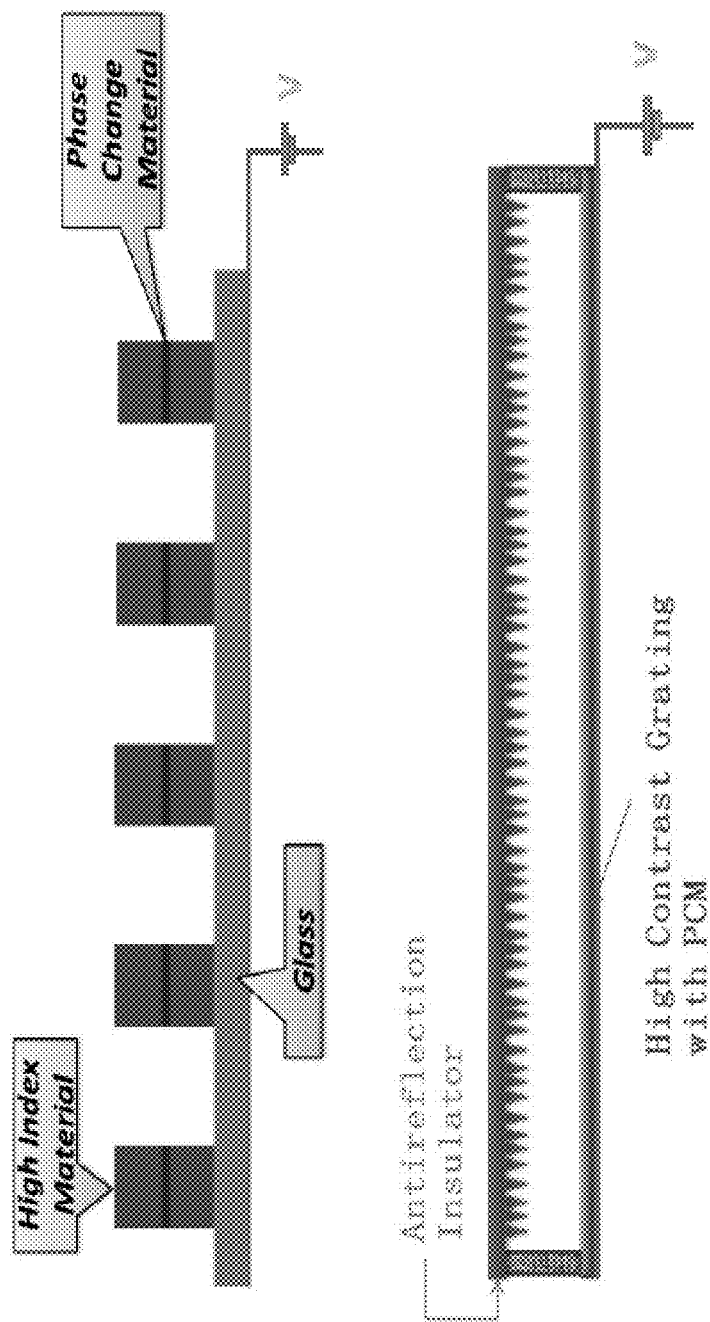
FIG. 20 is a schematic of still a further embodiment of a tunable sub-pixel in various reflective states. The upper panel shows a side view of the pillars comprising a phase change material (PCM), and the lower panel shows the grating and an antireflection layer.

The structure of an embodiment of a color filter which incorporates a phase change material is shown in FIG. 20. As shown in the upper portion of FIG. 20, each grating pillar has a "sandwich" structure. The middle layer of the sandwich is a phase change material (PCM), with an index of refraction which can be changed by applying an electric voltage. When the PCM is in one state, the grating can predominantly reflect a single color; while in another state, the resonance mode in the grating will be distorted and the reflectivity can be tuned to reflect a different wavelength range/color and/or to reflect the same or different wavelength range at a different level of intensity.

An embodiment of a sub-pixel structure is shown in the lower portion of FIG. 20. Either a parallel or a stacked structure of sub-pixels may be used to form a full color reflective display with this kind of tunable grating.

Figure 21:
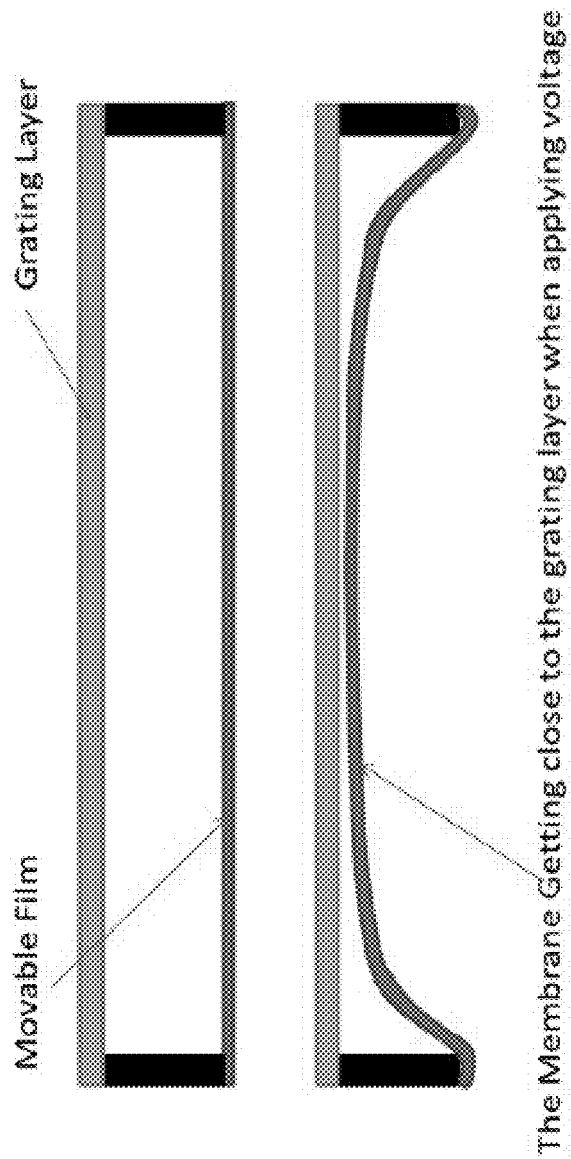
FIG. 21 is a schematic of an embodiment of a sub-pixel which is tunable using MEMS. The upper panel shows the tunable sub-pixel in one state; the lower panel shows the tunable sub-pixel in a different state.
Figure 22:
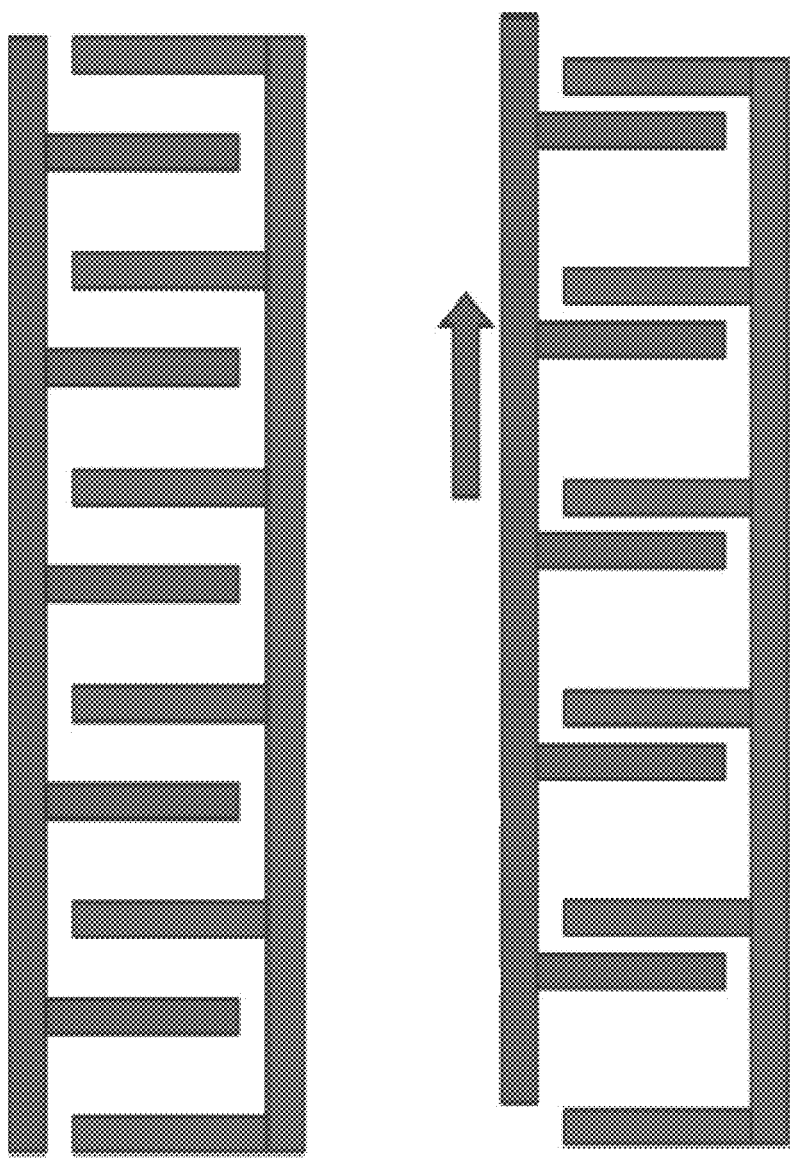
FIG. 22 is a schematic of an additional embodiment of a sub-pixel which is tunable using MEMS. The upper panel shows the tunable sub-pixel in one state; the lower panel shows the tunable sub-pixel in a different state.

A MEMS mechanism may also be used to distort the resonance in the gratings. The structures of two embodiments of a color filter which incorporate MEMS are shown in FIG. 21 and FIG. 22. In FIG. 21, a spring structure can be bent by electrostatic force to vary the distance between the reflective grating and a moveable film comprising, for example, an electrowetting liquid. As long as the distance between the spring and the grating is relatively small, such as between about 25 and 75 nm, or such as about 50 nm, the resonance will be distorted. In various embodiments, the film may also be moved by applying heat.

In certain embodiments, individual gratings are movable. When in a regular array, the gratings would be in an "on" state, where certain colors are reflected. The gratings could then be moved by means of a MEMS mechanism, such that adjacent pairs touch one another. When touching one another, the gratings would have different resonant modes, or even no resonant modes at all, and would therefore have different reflective properties. In some embodiments, when the gratings are moved such that adjacent pairs touch one another, the certain colors are not reflected and the gratings are in an "off" state.

In another example, individual gratings could move vertically. Some gratings move up, some move down, or both to make gratings at two different levels. When the gratings are level with one another, the gratings are in an "on" state, where certain colors are reflected. If the gratings are moved such that the two levels are separated by a phase difference of pi, then the gratings would reflect light that destructively interferes, and would therefore have different reflective properties. In some embodiments, when the gratings are moved vertically (e.g. by application of a voltage or heat), certain colors are not reflected and the gratings are in an "off" state.

FIG. 22 shows a schematic of two arrays of gratings which are arranged in a comb-like manner in the upper portion of FIG. 22, and when one array shifts laterally relative to the other, as shown in the lower portion of FIG. 22, the interaction between the gratings changes and results in a change in the intensity reflected light as described above.

Figure 23A:
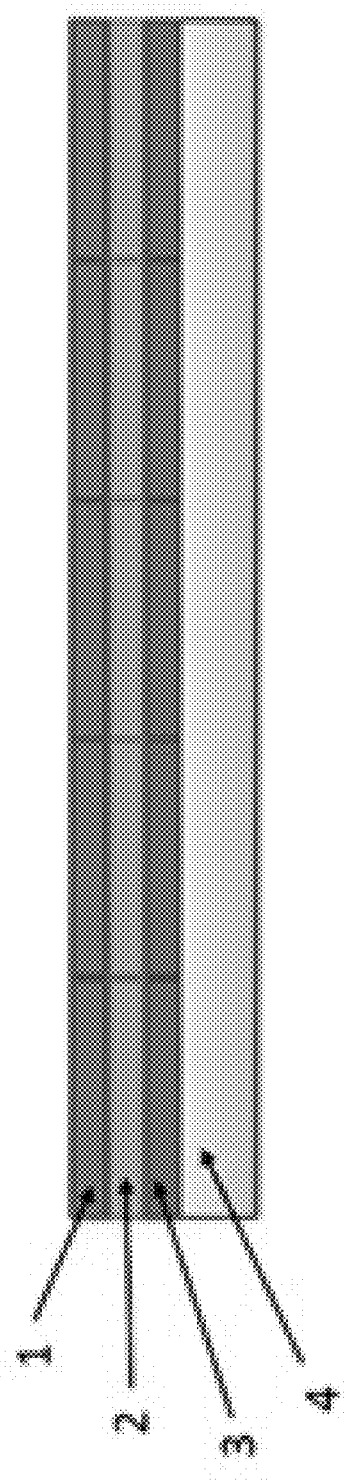
FIGS. 23(a)-23(b) show a full color pixel in FIG. 23(a) a multi-layer structure.
Figure 23B:
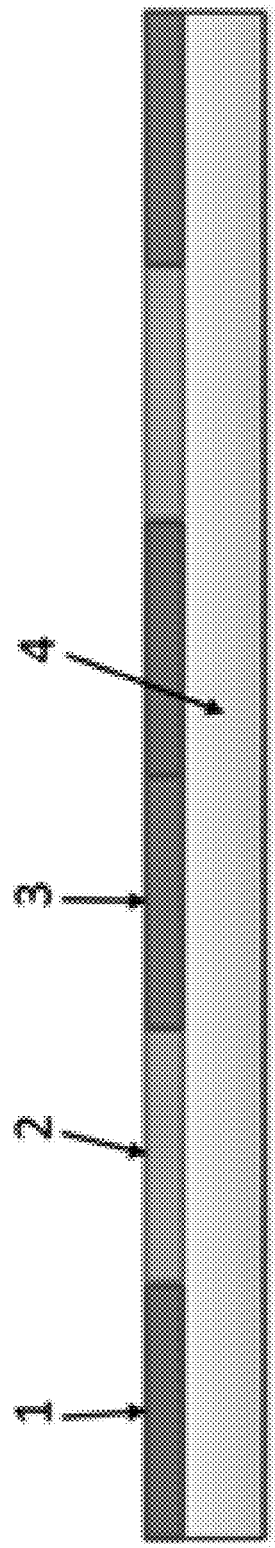

A variety of architectures may be used to construct a full color reflective display comprising the sub-wavelength high contrast gratings disclosed herein. In one embodiment, a multi-layer architecture may be used, as shown in FIGS. 23(a)-23(b), in which three types of pixels are employed to reflect blue, green and red color, respectively. In both FIG. 23(a) and FIG. 23(b), layer 1 is a layer of pixels which reflect blue light; layer 2 is a layer of pixels which reflect green light; and layer 3 is a layer of pixels which reflect red light. Layer 4 is a substrate, which may be absorptive to the entire spectrum of incident light, or may be transparent or partially absorptive.

In FIG. 23(a), the order of these three layers is defined to be blue, green and red from top to bottom. This order is designed to adapt the attendant wavelengths to the feature sizes of each layer. The first layer predominantly reflects blue color in a controllable manner, while other parts of the visible spectrum are transmitted to the second layer. The second layer of pixels predominantly reflects green color in a controllable manner, while other parts of the visible spectrum are transmitted to the third layer. The third layer of pixels predominantly reflects red color in a controllable manner, and it can be either absorptive or transparent to other parts of the visible spectrum. The substrate is absorptive to the entire visible spectrum. The number of layers is not limited to three.

The multi-layer architecture, or stacked design, has a theoretical maximum reflection efficiency of 100%, because each sub-pixel covers the same area as a full pixel. This high efficiency is useful for a reflective display lacking a built-in light source.

A single-layer architecture, or parallel design, is shown in FIG. 23(b), in which three types of pixels are arranged in one single layer, predominantly reflecting a controllable amount of blue, green and red color, respectively.

The high contrast gratings disclosed herein can also be used to build a transmissive display by employing a backlight layer. This embodiment is shown using FIG. 23(a) wherein the substrate layer (layer 4) is a backlight. The structure and methods of the pixels, sub-pixels, and high contrast gratings in the transmissive display are nearly identical to those of the reflective display, but the transmitted light forms the image instead of the reflected light. The reflected color of each type of pixel is not limited to what is shown in FIG. 23(a), nor is the number of layers.

In the multi-layer architecture shown in FIG. 23(a), ideally there are no overlaps between the reflection spectra of different layers. However, there are usually overlaps in real devices, for example, the green layer reflects green light as well as some undesired blue light. In this case, when the device is designed to display green, the topmost blue layer is turned off and becomes almost transparent, and white light is transmitted onto the green layer. The green layer will reflect both green light and some undesired blue light, resulting in an unsaturated "blue-green" color instead of the desired green color. A similar issue can happen to the red layer. To solve this issue, one or more absorptive filters may be added to the three-layer architecture, as is shown in FIG. 24.

Figure 24:
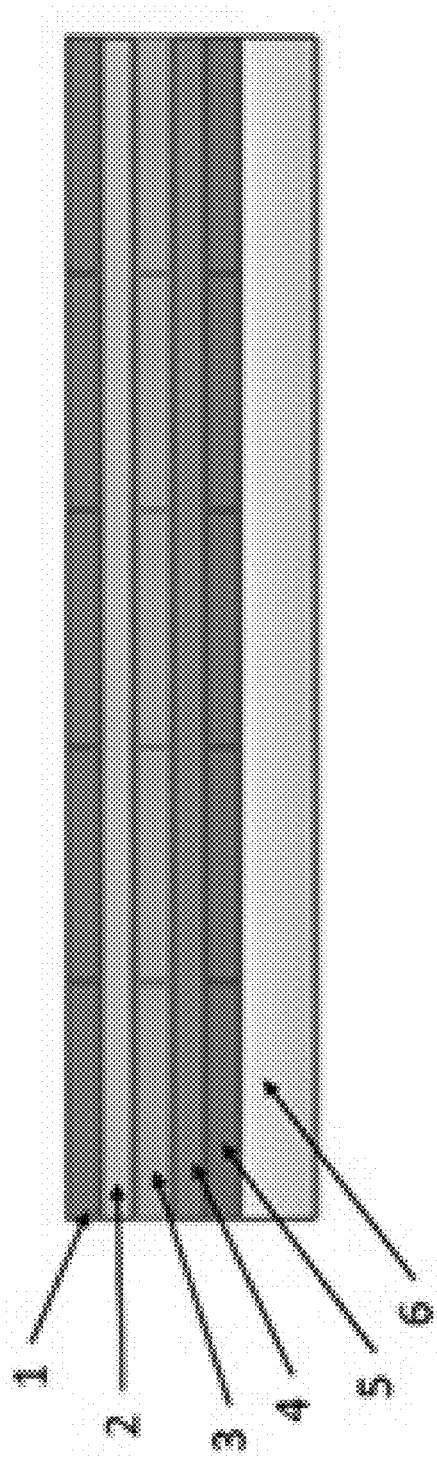
FIG. 24 shows an embodiment of a multi-layer display with absorptive filter layers.

In FIG. 24, layer 1 is a layer of pixels which reflect blue light. Layer 2 is an absorptive filter layer which absorbs blue light and which is transparent to the other parts of the visible spectrum. Layer 3 is a layer of pixels which reflect green light. Layer 4 is an absorptive filter layer which absorbs green light or both green and blue light, and which is transparent to the other parts of the visible spectrum. Layer 5 is a layer of pixels which reflect red light. Layer 6 is a substrate, which may be absorptive to the entire spectrum of incident light.

The two layers of absorptive filters shown in FIG. 24 enable the independent operation of the different pixel layers, and allow the existence of overlaps of the reflection spectrum of different pixel layers. An absorptive filter can be realized by any method, as long as it predominantly absorbs the light with a wavelength below a particular value, and transmits other light with a wavelength above this particular value. An embodiment of an absorptive filter is presented below.

Figure 25A:
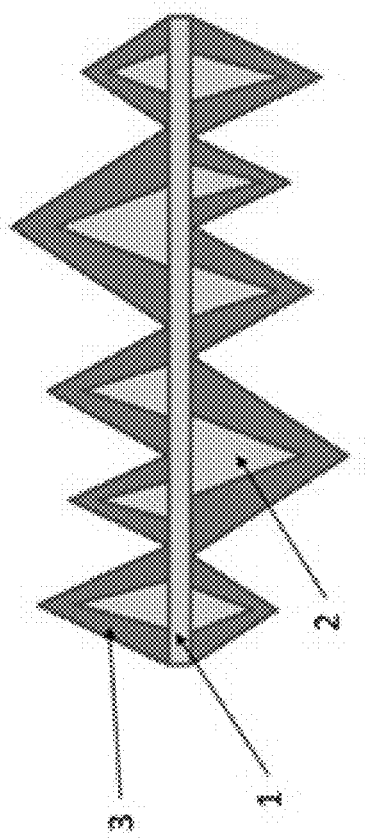
FIGS. 25(a)-25(b) show schematics of some embodiments of an exemplary absorptive filter layer.
Figure 25B:
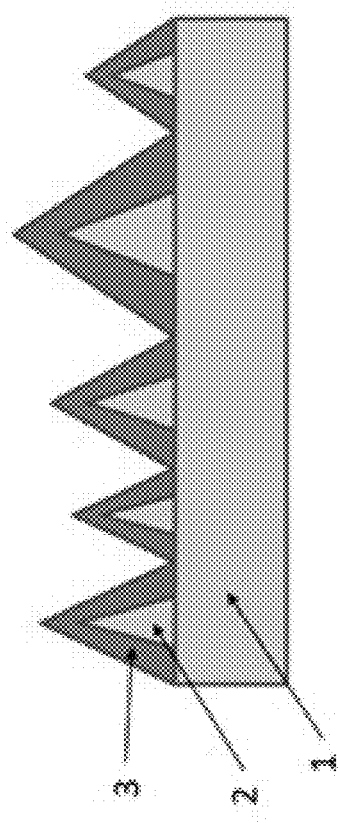

A random array of cones or other structures with varying geometries may be fabricated on the surface of a transparent substrate. Then an absorptive material may be coated on these structures, as is shown in FIGS. 25(a)-25(b). In FIG. 25(a), layer 1 is a transparent substrate; layer 2 is a nanostructure on the substrate which provides an anti-reflective property; and layer 3 is an absorptive coating which absorbs light within the desired wavelength range. In FIG. 25(b), layer 1 is a transparent substrate or a color filter layer; layer 2 is a nanostructure on the substrate which provides an anti-reflective property; and layer 3 is an absorptive coating which absorbs light within the desired wavelength range. The absorptive filter can be an independent layer or it can be integrated with other layers in a pixel structure.

The color filters disclosed herein can also have different reflection and/or transmission spectra in response to polarized light. This can occur by introducing asymmetric patterns on the color filter, in certain embodiments. These polarization dependent color filters may be employed in a color display to form two different images with different polarization states, and a 3-dimensional image may be formed with the help of corresponding polarization glasses.

Figure 26A:
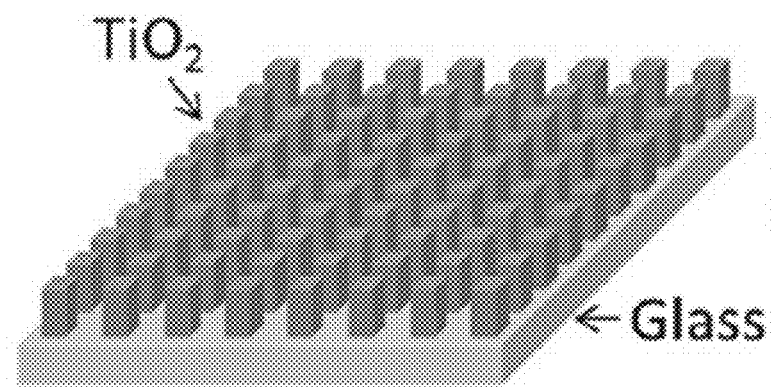
FIGS. 26(a)-26(b) show the calculated reflection spectra of an exemplary high contrast grating as seen in FIG. 26(a), under normal incident light with different the polarization angles shown in FIG. 26(b).
Figure 26B:
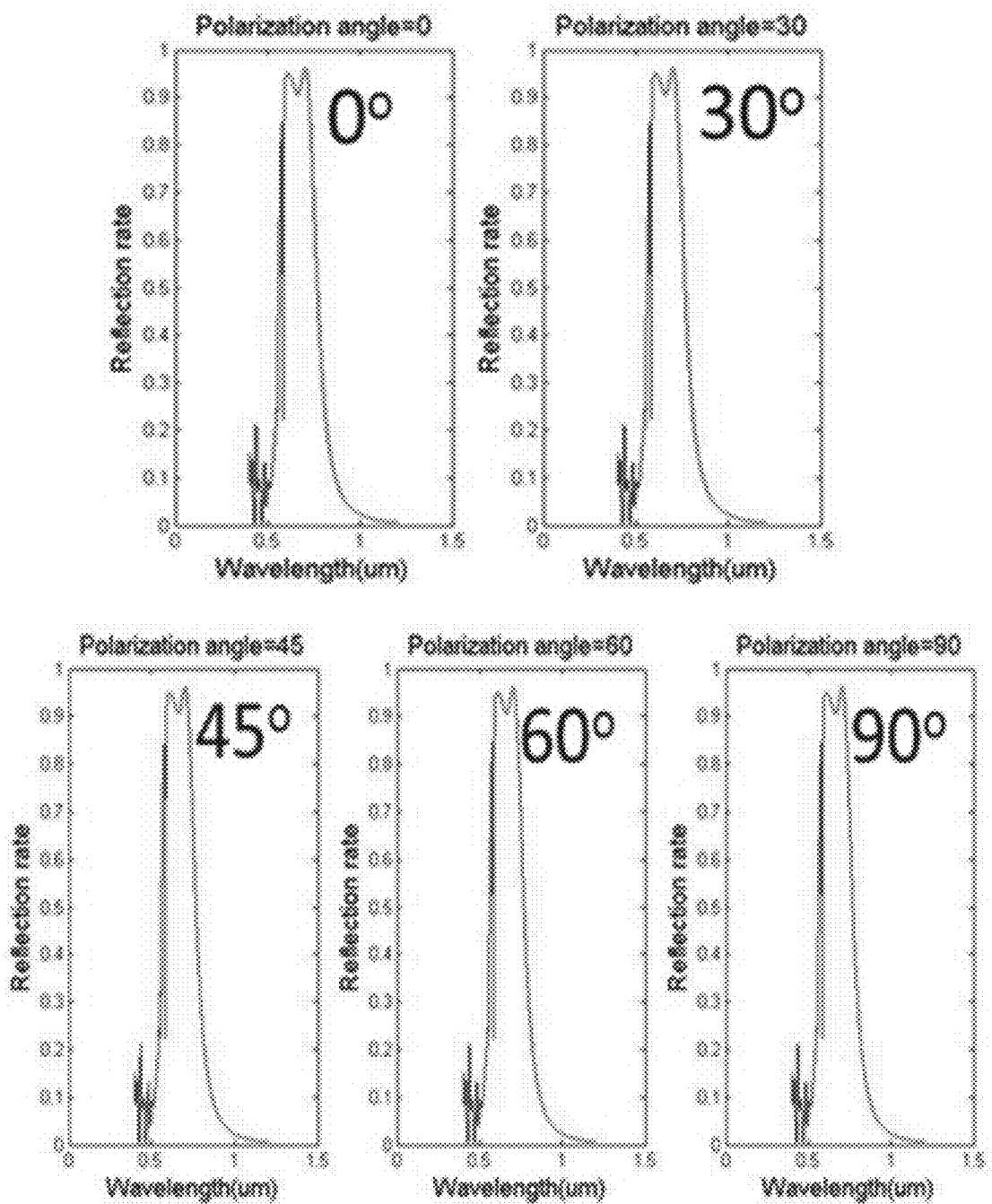

As reflective displays work with unpolarized light, however, the color filters used herein are designed to be polarization independent. A theoretical study using with a high contrast grating made of pillars of $TiO_2$ on a glass substrate, as shown in FIG. 26(a), confirmed such independence. The period, width and height of the simulated pillars were 450, 250 nm and 300 nm, respectively. The modeling was performed via the finite-difference time-domain (FDTD) method using commercial software (FDTD Solutions from Lumerical Solutions, Inc., Vancouver, Canada). As is evident from the reflection spectra at polarization angles of 0°, 30°, 45°, 60° and 90°, shown in FIG. 26(b), about 95% of the light within the red color range (about 600 nm to about 850 nm) can be reflected at all measured polarizations.

The following non-limiting Examples are intended to be purely illustrative, and show specific experiments that were carried out in accordance with embodiments of the invention.

EXAMPLE

A full-color reflective display system was fabricated using a three-layer architecture to achieve high brightness, which incorporated reflective color filters based on the high-contrast gratings disclosed herein. The reflective filters exhibited both high reflectance and high color saturation. The feasibility of switching of each color filter using electrowetting techniques has been demonstrated. Finite-difference time-domain-based simulations were used in the design of the filters as well as to evaluate their performance. The fabrication process combined interference lithography, nanoimprint lithography, linewidth tuning, and reactive ion etching. Exemplary blue and the green filters were both fabricated and characterized experimentally.

For a reflective color display, it is important for the reflectance to be adjustable between at least two states. As discussed, the reflection of the gratings arises from optical resonance and is closely related to contrast of the index of refraction between the grating and its background. Hence, tuning the index of refraction of the background will affect the reflectance of the display. This was confirmed by the simulation results shown in FIG. 27, which show that when the background index is tuned to 1.75, the average reflectance drops down to about 0.2.

Figure 27:
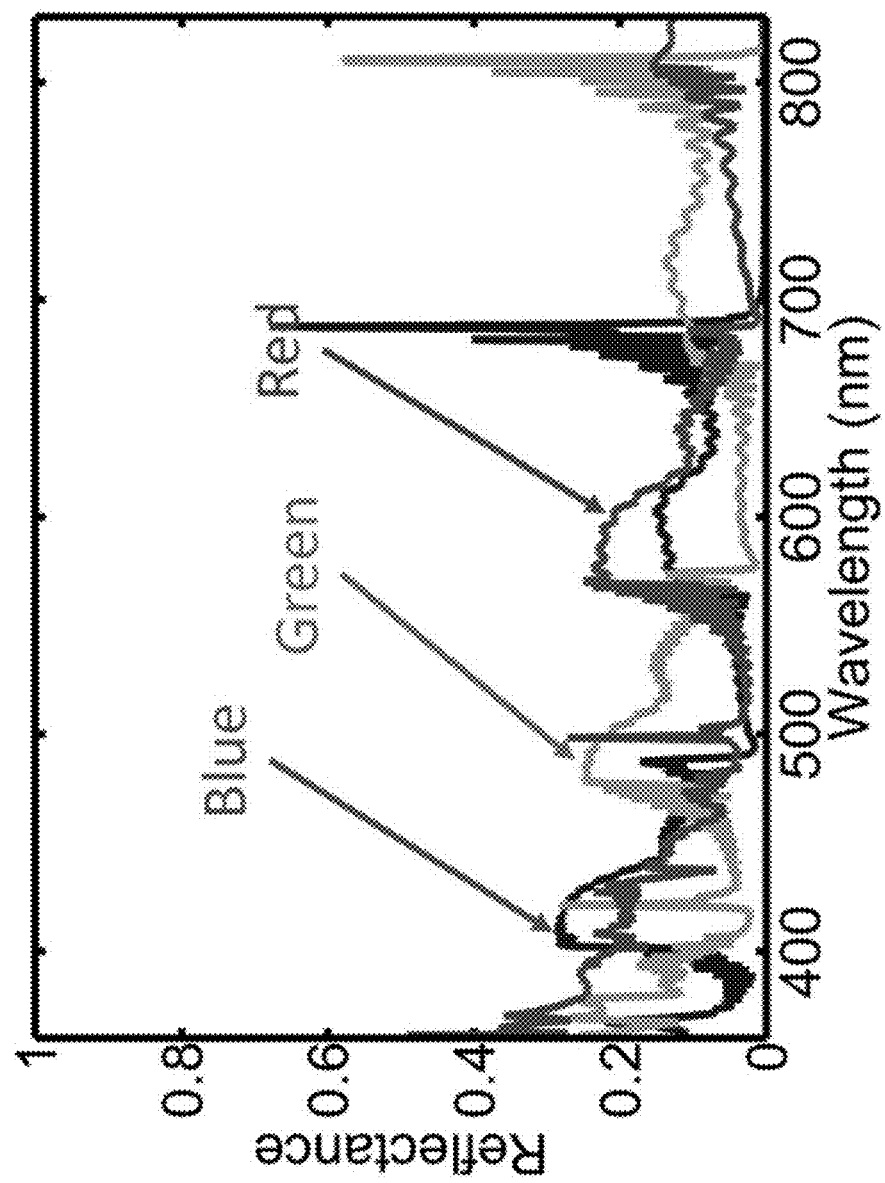
FIG. 27 is the calculated reflection spectra of the blue, green and red color filters when the background index is 1.75.

The situation of a display with a high reflectance and a small background index is shown in FIG. 8, which corresponds to the "on" state, whereas the situation shown in FIG. 27 is the "off" state. A contrast ratio value of about 4:1 is also obtained from the simulation. However, the experimental results show that the displays exhibit an even higher contrast ratio, that of about 9:1 (discussed in more detail below). These results show that a continuously tunable brightness is achieved in a color display by adjusting the contact area of an electrowetting liquid with the high contrast gratings disclosed herein. Further, the reflective color filters possessed a moderate bandwidth and high reflectance in accordance with the benchmark shown in FIG. 1(b).

Figure 28:
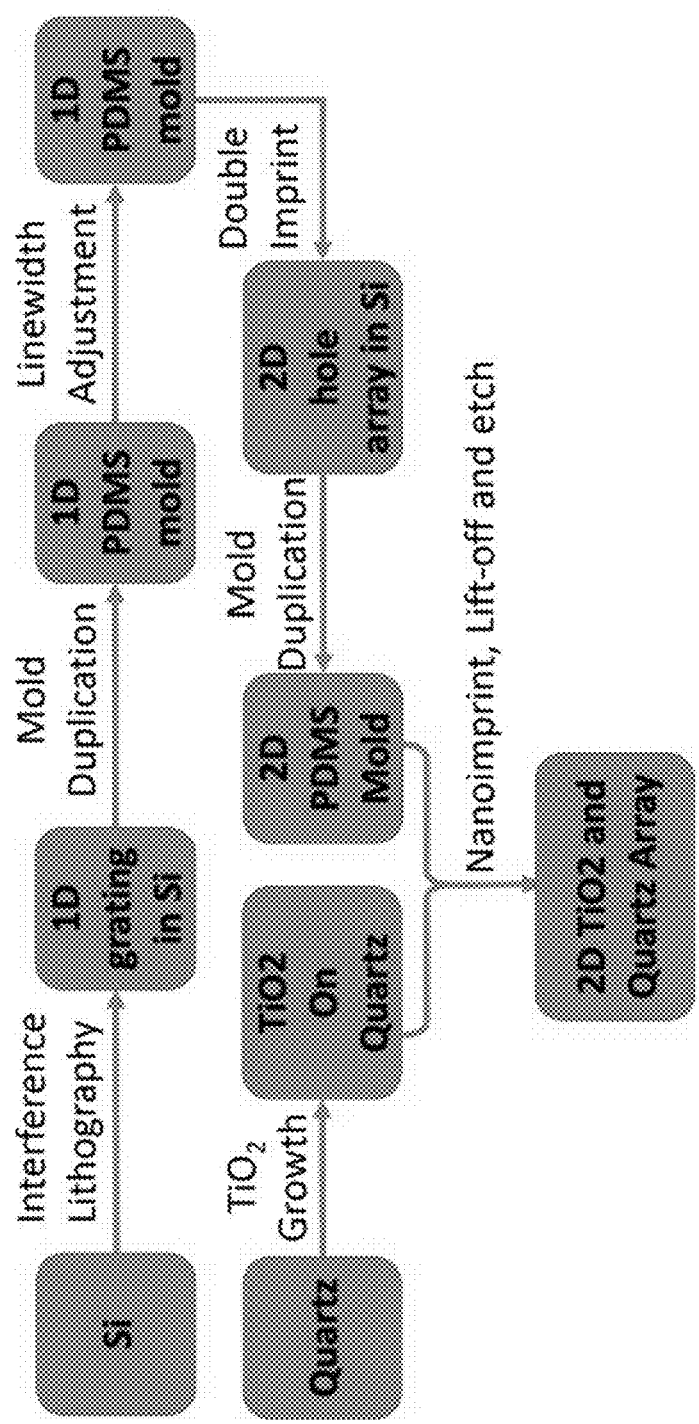
FIG. 28 shows a flow chart for a fabrication process used to make an exemplary high contrast grating.

The fabrication process for the high contrast gratings is summarized in the flow chart of FIG. 28. The gratings were fabricated using nanoimprint lithography, and the molds were fabricated using interference lithography with a continuous-wave laser source at 266 nm.

Figures 29A, 29B:
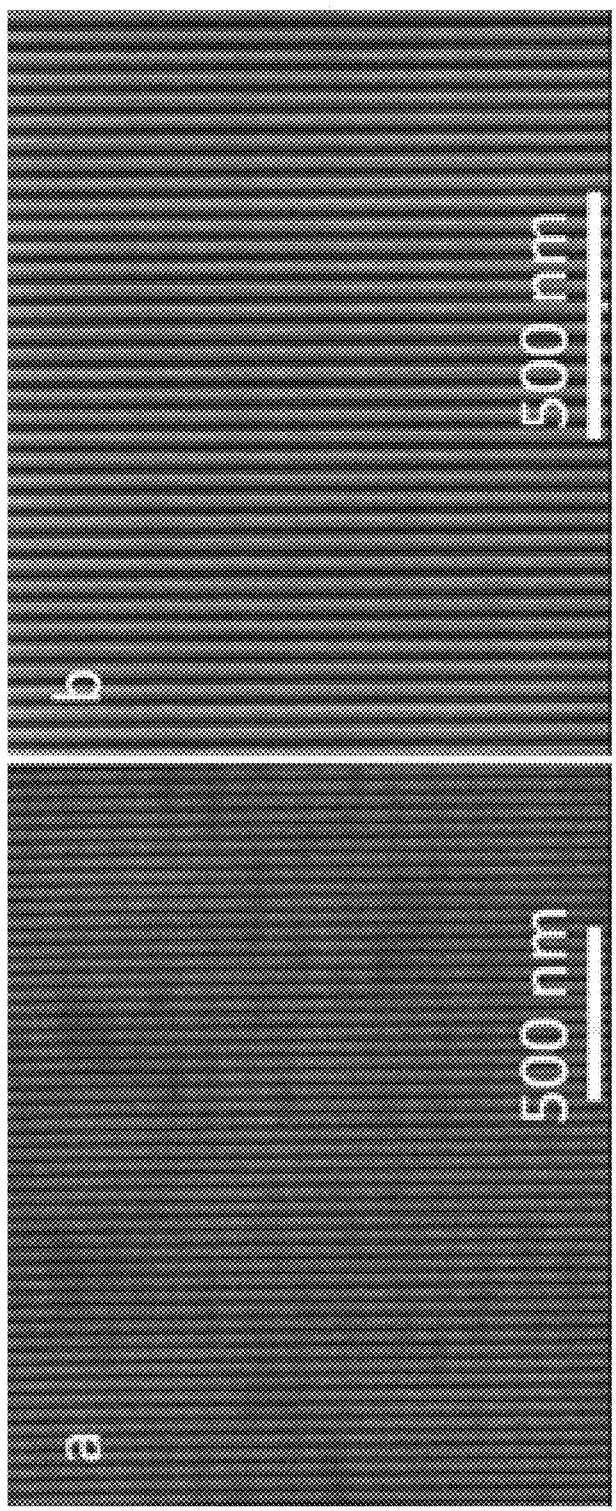
FIGS. 29(a)-29(b) show SEM images for molds used in the fabrication of exemplary blue (FIG. 29(a)) and green (FIG. 29(b)) color filters.

FIGS. 29(a)-29(b) show two gratings in the photoresist after the exposure and development. FIG. 29(a) is a SEM image of the mold for the blue filter, and FIG. 29(b) shows the mold for the green filter. The grating patterns were transferred to the bottom silicon substrate by inductively coupled plasma (ICP) reactive ion etching (RIE), and the resist can subsequently be removed by Piranha solutions, leaving clean Si mother-molds.

Figures 30A, 30B:
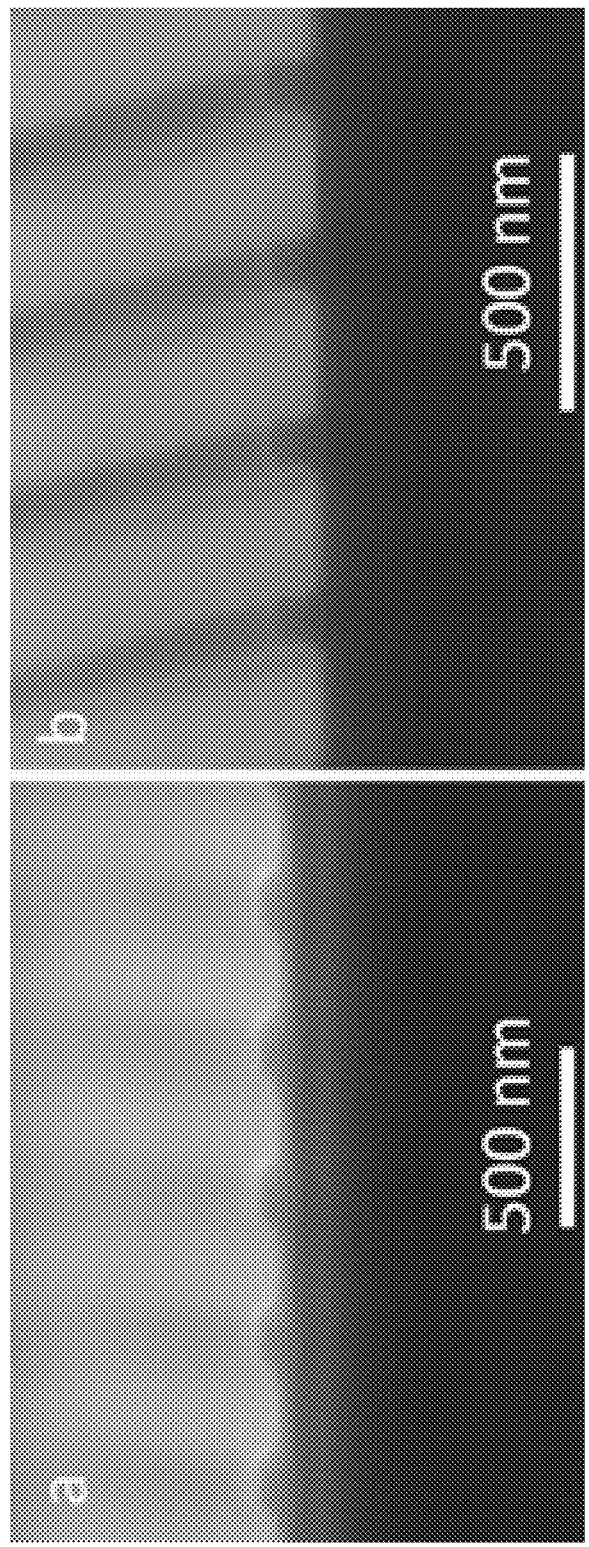
FIGS. 30(a)-30(b) show additional SEM images for molds used in the fabrication of exemplary color filters.

The polydimethylsiloxane (PDMS)-based flexible molds were duplicated from these mother-molds and were used in the following nanoimprint lithography, transferring the grating patterns to a UV-curable resist layer, as shown in FIGS. 30(a)-30(b). Then, metal deposition, lift-off, and Si etching processes were done to obtain a one-dimensional Si grating mold with a desired linewidth.

FIG. 30(a) is an SEM image of the imprint result from the PDMS mold, with a silicon substrate and the grating patterns in the top UV-curable resist layer with a PMMA layer between the substrate and the grating layers. FIG. 30(b) is an SEM image of the isotropic etching result of FIG. 30(a), where the linewidth is reduced to a desired value.

Figures 31A, 31B:
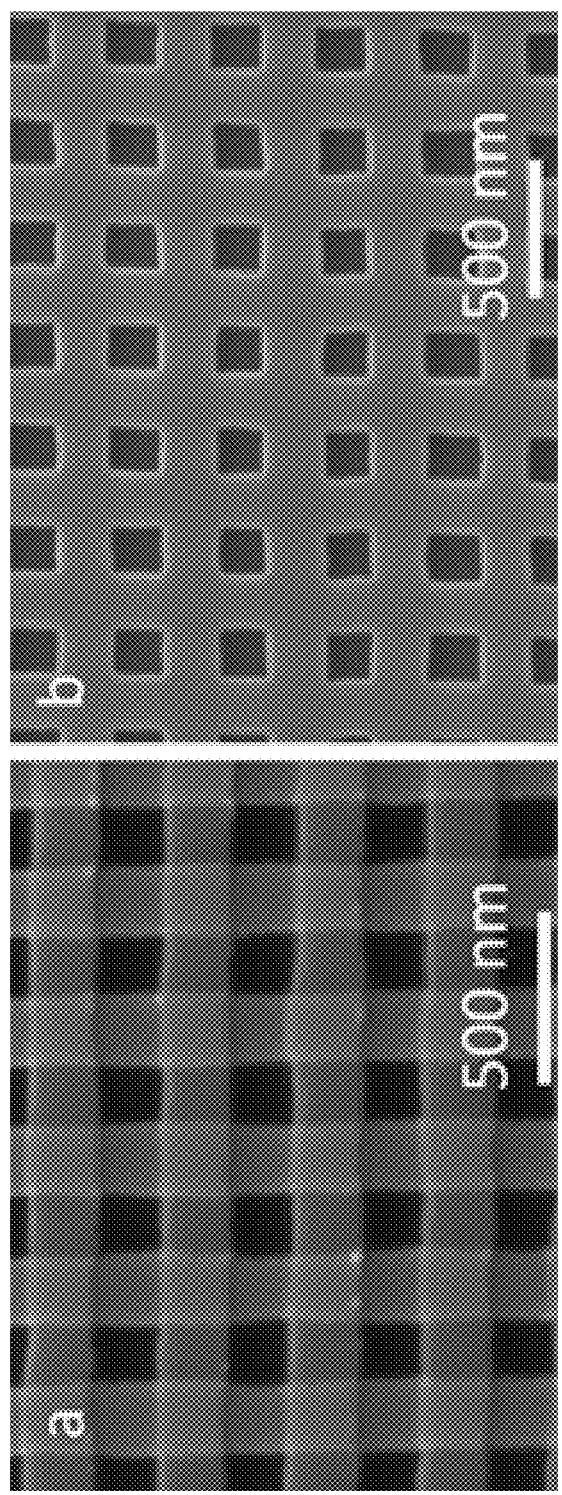
FIGS. 31(a)-31(b) show further SEM images of molds used in the fabrication of exemplary color filters.

Based on this Si mold, PDMS molds were duplicated and used to perform imprint and lift-off twice on a single Si substrate, resulting in a 2D metal grid mask, as shown in FIG. 31(a), and then, a Si mold was obtained through ICP RIE etching, as shown in FIG. 31(b). Specifically, FIG. 31(a) is an SEM image of the 2D metal mask on top of the silicon substrate, and FIG. 31(b) is an SEM image of the subsequent 2D hole array in the silicon. Finally, 2D PDMS molds with the desired grating dimensions were duplicated from these 2D Si molds.

A $TiO_2$ layer was sputtered on top of a quartz substrate, using a direct current magnetron sputter instrument. The $TiO_2$ layer was etched by RIE and the recipes were optimized to obtain a vertical sidewall profile. An RIE etching recipe with a gas combination of $SF_6$, $C_4F_8$, and $O_2$ was developed, and a comparison of the etching profiles from different recipes is listed in Table I, below, and shown in FIGS. 32(a)-32(d). Recipe (d) was determined to provide the best etching profile.

FIGS. 32(a)-32(d) show a comparison of the $TiO_2$ etching recipes of Groups (a)-(d) of Table 1, showing that the image 32(d) for recipe (d) exhibits the cleanest sidewall profile.

Table 1 shows etching recipes of $TiO_2$ by RIE. Provided are the ICP and forward power, the flows of the $SF_6$, $C_4F_8$, and $O_2$ gases, and the pressure.

TABLE 1

| Group | ICP power (W) | RIE power (W) | $SF_6$ flow (SCCM) | $C_4F_8$ flow (SCCM) | $O_2$ flow (SCCM) | Pressure (mTorr) |
|---|---|---|---|---|---|---|
| a | 0 | 25 | 25 | 10 | 0 | 10 |
| b | 0 | 25 | 25 | 0 | 10 | 10 |
| c | 0 | 25 | 25 | 10 | 20 | 10 |
| d | 0 | 25 | 25 | 10 | 10 | 10 |

Figure 33:
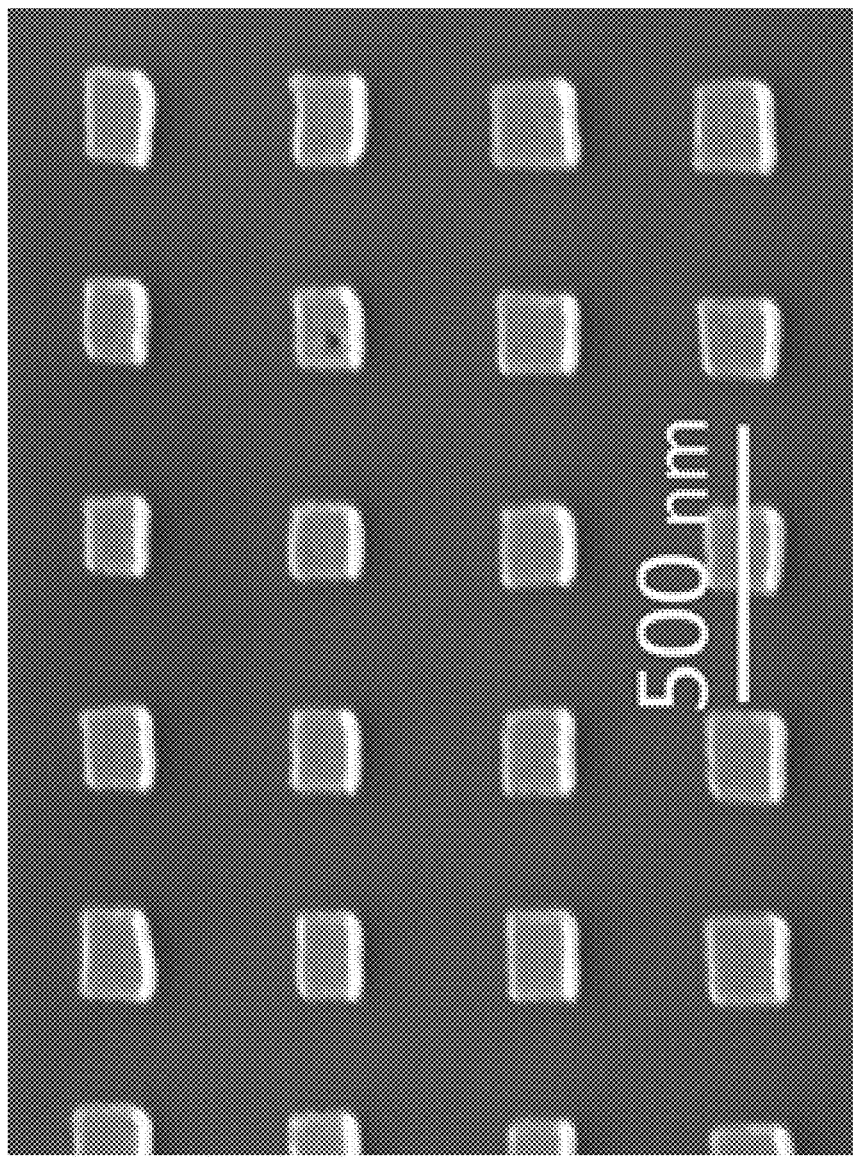
FIG. 33 shows an SEM image of a 2-dimensional metal mask on a $TiO_2$ surface.

The 2D patterns were transferred to the $TiO_2$ layer via nanoimprint and lift-off processes using the 2D PDMS molds, wherein the 2D metal mask was formed after the lift-off, and after the etching of $TiO_2$ and quartz, the final 2D grating was fabricated and shown in FIG. 33. FIG. 33 shows an SEM image of the 2D metal mask on top of the $TiO_2$ surface.

Figures 34A, 34B:
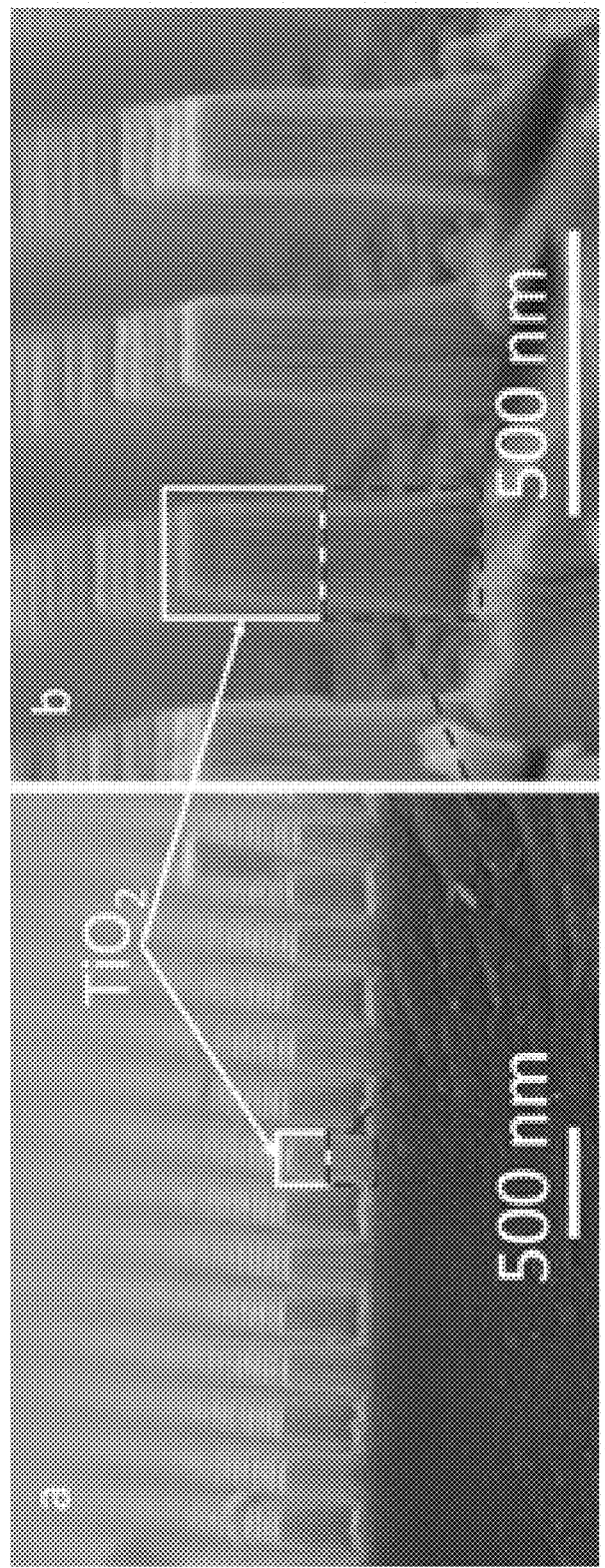
FIGS. 34(a)-34(b) show SEM images of exemplary color filters fabricated as described.

SEM images of the blue and green filters are shown in FIGS. 34(a)-34(b). FIG. 34(a) shows an SEM of the blue filter, and FIG. 34(b) shows an SEM of the green filter. The two layers of the pillars which comprise the filter are marked, showing the $TiO_2$ upper layer (white solid box) and $SiO_2$ lower layer (red dashed box).

The fabrication deviation of the pitch, linewidth, and height are all within 5%, but the sidewall profile of the grating pillars is not perfectly vertical. The measured reflection spectra on both the on and off states of the blue and green filters are shown in FIGS. 35(a)-35(d). FIG. 35(a) shows the measured and simulated reflection spectra of the "on" state of the blue filter; FIG. 35(b) shows the spectra of the "on" state of the green filter; FIG. 35(c) shows the spectra of the "off" state of the blue filter; and FIG. 35(d) shows the spectra of the "off" state of the green filter.

Figures 36A, 36B:
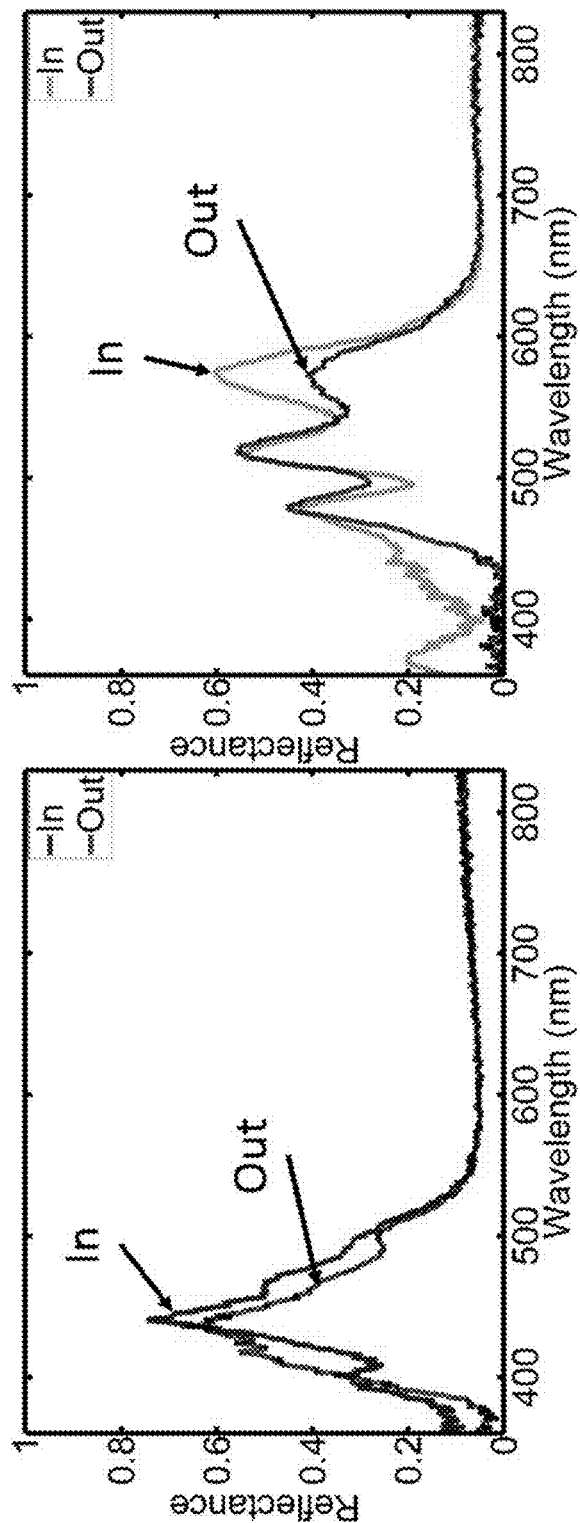
FIGS. 36(a)-36(b) are the measured reflectance spectra for the front (in) and the back (out), sides of an exemplary blue (seen in FIG. 36(a)) and an exemplary green (seen in FIG. 36(b)) color filter.

As is evident from FIGS. 35(a)-35(d), the actual peak values of the reflection spectra are lower than the simulation results in both the on and off states, with the measured contrast ratios at about 9:1 for the blue filter and about 7:1 for the green filter. In addition, the reflection spectra of both sides of the blue and green filters are measured and are shown in FIGS. 36(a)-36(b). Specifically, FIG. 36(a) shows the measured reflection spectra from the front (in) and back (out) sides of the blue filter, and FIG. 36(b) shows the same spectra for the green filter.

Figure 37:
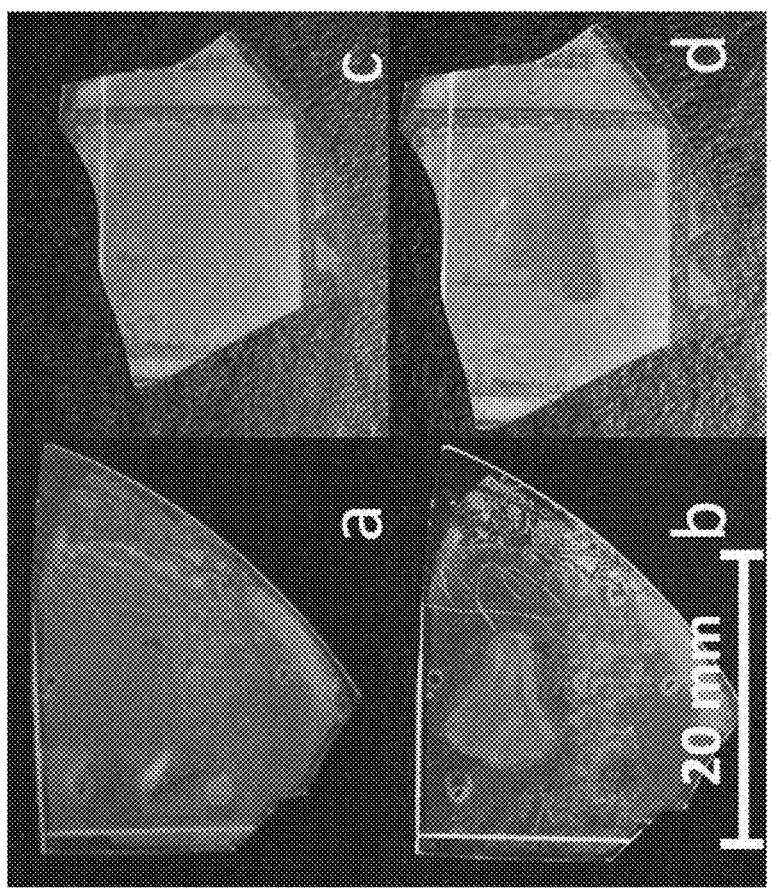
FIG. 37 shows photographs of exemplary color filters in the on and off states.

The reflection spectra from the front and back sides of each filter are very similar, and any difference can be attributed to surface scattering and defects on the back side. This feature is related to an efficient output coupling because, as can be seen in FIG. 36(a), the green and red light is not reflected significantly when transmitting through the blue filter from the back side. This suggests the possibility of achieving an efficient output of the green and red light. The actual visualization of the on and off states is shown in FIG. 37. Panel (a) is a photograph of the blue filter without a liquid present (the "on" state); panel (b) is the blue filter with the liquid present (the "off" state); panel (c) is the green filter without a liquid present (the "on" state); and panel (d) is the green filter with the liquid present (the "off" state).

The color filters display their blue and green colors without liquid present (i.e. in the "on" state), and become transparent with liquid present (i.e. in the "off" state) to reveal the underlying black substrate. In various embodiments, any liquid that can be driven by electricity may be used as an electrowetting fluid. In general, selecting a fluid with a certain index of refraction may provide improved results, particularly for certain gratings. In certain embodiments, gem refractometer refractive index liquids (e.g. oils) may be used.

Figure 38:
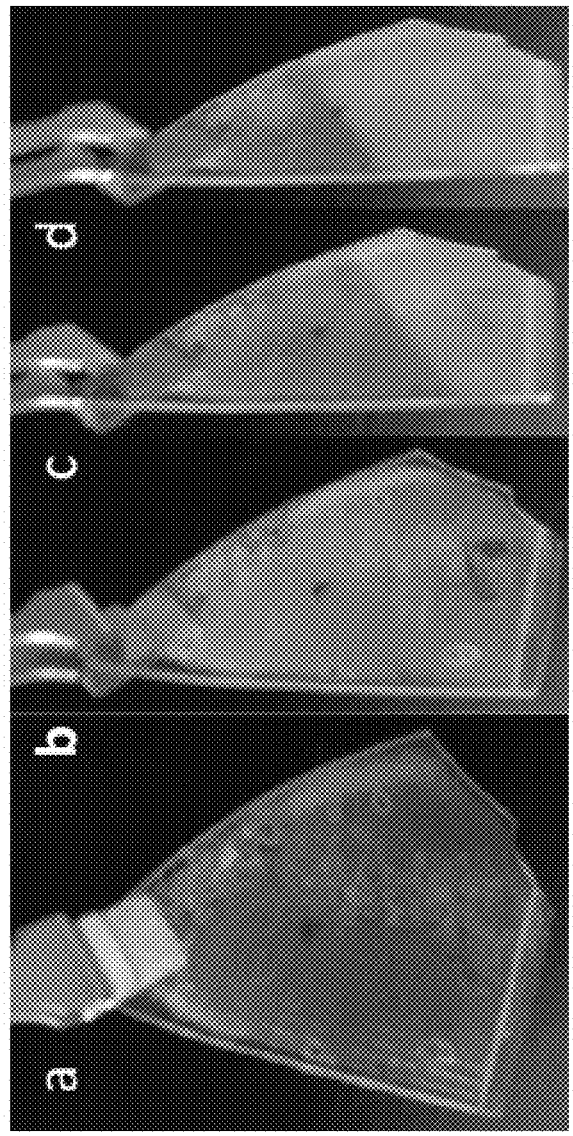
FIG. 38 shows photographs of an exemplary color filter at different tilting angles.

The visual effects of the blue filter at different tilting angles are shown in the photographs of FIG. 38. In this measurement, the camera and light source are fixed, and the color filter is tilted at different angles, exhibiting a combination of the off-normal illumination and viewing. Specifically, FIG. 38 shows the visible colors of the blue filter at different tilting angles. The tilting angle increases from panel (a) 5°, panel (b) 15°, panel (c) 30°, and panel (d) 40°. Some green color is seen owing to fabrication defects.

As is evident from the photographs, the blue color does not shift much, which is in accordance with the simulation results. These visual results highlight the utility of this reflective display design.

The measured and simulated reflection spectra for the filters are not exactly the same, and this difference could arise for several reasons. First, the fabrication results, and especially the sidewall profile of the grating pillars, deviate from ideal simulation settings. Second, the refractive index and absorption of the deposited $TiO_2$ material are different from those used in the simulation model. Finally, the roughness resulting from the etching process results in a different boundary than those in the simulation settings. Additionally, only two discrete states, namely "on" and "off" are shown for the color filters tested. For a continuously adjustable (tunable) reflection, one could control the contact area of the liquid and the reflective grating via electrowetting, and thereby obtain different gray scales.

In summary, a full-color display is disclosed which may be used for both reflectance and transmissive applications of light. The filters may comprise a high-contrast grating, and a variety of methods may be used to switch the filters from one state to another. A continuously adjustable, or tunable, switching mechanism may be used to produce intermediate states of the grating. Blue and green filters have been fabricated using nanoimprint lithography, and their "on" and "off" states have been shown. The actual contrast ratios of the filters are as large as 9:1. Studies performed on the blue color filter show that good color fidelity can be achieved over large tilting angles. High brightness, a large color gamut, and a high contrast ratio can be achieved for color displays using this design.

Various features and advantages of the invention are set forth in the following claims.

What is claimed is:

1. A reflective display for an electronic device, comprising:
a plurality of pixels including a respective pixel having a plurality of sub-pixels, the plurality of sub-pixels including a sub-pixel that is modulatable to reflect light within various ranges of wavelengths and at various intensity levels, the sub-pixel having
a color filter with a modulatable high contrast grating, and
a plurality of states including a first state and a second state,
the first state reflecting at least one of light within a different range of wavelengths or light of a different intensity level than the second state, and the sub-pixel being modulatable to any of a plurality of intermediate states between the first state and the second state inclusive.

2. The reflective display of claim 1, wherein the modulatable high contrast grating is coupled to an electrode and wherein the sub-pixel further comprises
a transparent electrode spaced apart from the modulatable high contrast grating, and
an electrowetting liquid between the transparent electrode and the modulatable high contrast grating,
wherein the electrowetting liquid shifts between the transparent electrode and the modulatable high contrast grating when a voltage is applied between the transparent electrode and the electrode coupled to the modulatable high contrast grating.

3. The reflective display of claim 2, wherein the sub-pixel further comprises a sidewall between an outer edge of the transparent electrode and an outer edge of the modulatable high contrast grating, wherein when a voltage is applied to the sidewall the electrowetting liquid shifts between a central region of the modulatable high contrast grating and a lateral region of the modulatable high contrast grating.

4. The reflective display of claim 2, wherein the sub-pixel further comprises a substrate between the transparent electrode and the modulatable high contrast grating.

5. The reflective display of claim 4, wherein the substrate has a pore therein and wherein the electrowetting liquid moves through the pore.

6. The reflective display of claim 4, wherein the sub-pixel further comprises a first electrowetting liquid above the substrate and a second electrowetting liquid below the substrate.

7. The reflective display of claim 6, wherein the first electrowetting liquid has a first index of refraction and the second electrowetting liquid has a second index of refraction different from the first index of refraction.

8. The reflective display of claim 6, wherein the first electrowetting liquid shifts between the transparent electrode and the substrate when a voltage is applied between the transparent electrode and the substrate.

9. The reflective display of claim 1, wherein the modulatable high contrast grating comprises a plurality of pillars.

10. The reflective display of claim 9, wherein the plurality of pillars are spaced apart in a regular pattern having a periodicity.

11. The reflective display of claim 9, wherein the modulatable high contrast grating comprises a substrate and wherein each of the plurality of pillars comprises a proximal portion coupled to the substrate and a distal portion away from the substrate.

12. The reflective display of claim 11, wherein each of the plurality of pillars is straight, capped or T-shaped.

13. The reflective display of claim 11, wherein the distal portion of each of the plurality of pillars is made from a different material than the proximal portion of each of the plurality of pillars.

14. The reflective display of claim 11, further comprising an electrically-activated phase change portion between the distal portion of each of the plurality of pillars and the proximal portion of each of the plurality of pillars.

15. The reflective display of claim 1, further comprising a film spaced apart from the modulatable high contrast grating, wherein the film is attached to a spring structure and wherein movement of the film toward or away from the modulatable high contrast grating changes the reflective properties of the modulatable high contrast grating.

16. The reflective display of claim 1, wherein the modulatable high contrast grating comprises a pair of interleaved comb structures and wherein movement of the comb structures relative to one another changes the reflective properties of the modulatable high contrast grating.

17. The reflective display of claim 16, wherein the comb structures are moved laterally relative to one another.

18. The reflective display of claim 1, wherein the modulatable high contrast grating reflects light within a range of wavelengths that is within the visible spectrum.

19. The reflective display of claim 1, wherein the modulatable high contrast grating comprises a two-dimensional net grating.

20. The reflective display of claim 19, wherein the two-dimensional net grating is coupled to a substrate.

21. The reflective display of claim 1,
wherein the sub-pixel further includes a substance surrounding the color filter, wherein the sub-pixel is modulatable based on a position of the color filter relative to the substance.

22. The reflective display of claim 1, wherein the plurality of sub-pixels are stacked, wherein light not reflected by a first sub-pixel of the plurality of sub-pixels is transmitted to a second sub-pixel of the plurality of sub-pixels under the first sub-pixel.

23. The reflective display of claim 21, wherein the substance is a gas, a liquid or a solid.

* * * * *